United States Patent
Amiri et al.

(10) Patent No.: US 12,206,465 B2
(45) Date of Patent: Jan. 21, 2025

(54) PREDICTING WIRELESS MEASUREMENTS BASED ON VIRTUAL ACCESS POINTS

(71) Applicant: QUALCOMM Incorporated, San Diego, CA (US)

(72) Inventors: Roohollah Amiri, San Diego, CA (US); Srinivas Yerramalli, San Diego, CA (US); Taesang Yoo, San Diego, CA (US); Mohammed Ali Mohammed Hirzallah, San Diego, CA (US); Marwen Zorgui, San Diego, CA (US); Mohammad Tarek Fahim, San Diego, CA (US); Rajat Prakash, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 17/657,920

(22) Filed: Apr. 4, 2022

(65) Prior Publication Data

US 2023/0318725 A1 Oct. 5, 2023

(51) Int. Cl.
*H04B 17/391* (2015.01)
*H04B 17/309* (2015.01)
(Continued)

(52) U.S. Cl.
CPC ....... *H04B 17/3913* (2015.01); *H04B 17/309* (2015.01); *H04W 4/023* (2013.01);
(Continued)

(58) Field of Classification Search
CPC .................. H04B 17/3913; H04B 17/309; H04B 17/328; H04B 7/06956; H04W 4/023;
(Continued)

(56) References Cited

U.S. PATENT DOCUMENTS 10,908,299 B1   2/2021  Tadayon et al.
2020/0221274 A1* 7/2020  Thubert ................. H04W 4/70
(Continued)

FOREIGN PATENT DOCUMENTS

WO   WO 2022047410 A2   3/2022
WO   WO 2022/191901 A1 * 9/2022

OTHER PUBLICATIONS

International Search Report and Written Opinion—PCT/US2023/014166—ISA/EPO—Jun. 30, 2023.
Kanhere O., et al., "Position Location for Futuristic Cellular Communications—5G and Beyond", IEEE Communications Magazine, vol. 59, No. 1, arxiv.org, Cornell University Library, 201 Olin Library Cornell University Ithaca, NY 14853, 7 Pages, Feb. 24, 2021, XP081891372, p. 4, 5.
(Continued)

*Primary Examiner* — Rushil P. Sampat
(74) *Attorney, Agent, or Firm* — QUALCOMM Incorporated

(57) ABSTRACT

Methods and apparatus for predicting wireless measurements based on virtual access points is described. In some embodiments, a location of a user equipment (UE) may be obtained, and given the location of the UE, an output may be generated using a machine learning model, the output including one or more predicted wireless measurements. The output may be indicative of a wireless channel in a multipath environment. In some variants, the machine learning model may have been trained by obtaining a training dataset including multipath components data and ground truth locations of a wireless device, and performing an optimization with respect to the multipath components data and the ground truth locations. In some implementations, a training output including a predicted multipath component may be produced during the training, and the optimization may include an iterative minimization of an error between at least the predicted multipath component and a labeled multipath component.

31 Claims, 16 Drawing Sheets

(51) Int. Cl.
 H04W 4/02 (2018.01)
 H04W 24/02 (2009.01)
 H04W 24/10 (2009.01)
 H04W 64/00 (2009.01)
(52) U.S. Cl.
 CPC .......... *H04W 24/02* (2013.01); *H04W 24/10* (2013.01); *H04W 64/00* (2013.01)
(58) Field of Classification Search
 CPC ..... H04W 24/02; H04W 24/10; H04W 64/00; H04W 64/006; G01S 5/0247; G06N 20/00
 See application file for complete search history.

(56) References Cited

U.S. PATENT DOCUMENTS

| 2021/0400438 A1* | 12/2021 | Tran | H04W 4/02 |
| 2022/0007137 A1* | 1/2022 | Choi | G06N 3/088 |
| 2022/0014424 A1* | 1/2022 | Yadav | G06N 5/04 |
| 2024/0155553 A1* | 5/2024 | Ali | H04B 17/3913 |

OTHER PUBLICATIONS

Xiao Z., et al., "C-GRBFnet: A Physics-Inspired Generative Deep Neural Network for Channel Representation and Prediction", arxiv.org, Cornell University Library, 201 Olin Library Cornell University Ithaca, NY 14853, Dec. 5, 2021, 18 Pages, XP091113609, the whole document.

Amiri R., et al., "Spatial Indexing for System-Level Evaluation of 5G Heterogeneous Cellular Networks", IEEE VTC—Fall, 2020, arXiv:2005.11289v1 [cs.IT] May 22, 2020, 6 Pages.

Cbtnuggets, "Networking Basics: What are BGP Route Reflectors for IPv6", URL: https://www.cbtnuggets.com/blog/technology/networking/networking-basics-what-are-bgp-route-reflectors-for-ipv6, Jul. 31, 2019, 8 Pages.

Sonicwall: "Overview of Wireless Virtual Access Point (VAP)", URL: https://www.sonicwall.com/support/knowledge-base/overview-of-wireless-virtual-access-point-vap/170505810128245/, Mar. 26, 2020, 2 Pages.

Wikipedia: "Network Tap", https://en.wikipedia.org/wiki/Network_tap, Last Edited on May 20, 2022, 7 Pages.

* cited by examiner

PREDICTING WIRELESS MEASUREMENTS BASED ON VIRTUAL ACCESS POINTS

BACKGROUND

1. Field of Disclosure

The present disclosure relates generally to the field of wireless communications, and more specifically to predicting wireless measurements associated with a user equipment (UE) using virtual access points to improve positioning of the UE.

2. Description of Related Art

Learning the positions of virtual transmitters (e.g., virtual access points) is one approach to learning the wireless environment, including the position of a UE in a multipath environment. A multipath environment may include one or more reflecting surfaces, such as a building wall, the ground, or other objects preventing line-of-sight (LoS) transmission of signals between a transmitter and a receiver (e.g., the UE).

Moreover, machine learning has enhanced the accuracy and the utility of certain applications. By training a machine learning model using training data, the model may predict desired information given new inputs. Training data may include "ground truth," which is information that is known to be real or true, and obtained by observation and measurement, but not necessarily true. Hence, data containing, for example, locations and multipath components may be used to train a machine learning model to generate an inference of multipath components, which may be indicative of a position of the UE.

BRIEF SUMMARY

In a first aspect of the present disclosure, a method of predicting wireless channel data associated with a user equipment (UE) of a wireless network is disclosed. In some embodiments, the method includes: obtaining a location of the UE; and given the location of the UE, generating an output comprising one or more predicted wireless measurements using a first machine learning model, the first machine learning model trained by at least: obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and performing an optimization with respect to the multipath components data and the ground truth locations.

In another aspect of the present disclosure, a network node within a wireless network is disclosed. In some embodiments, the network node includes: at least one wireless communication interface; memory; and one or more processors communicatively coupled to the at least one wireless communication interface and the memory, the one or more processors configured to: obtain a location of a user equipment (UE); and given the location of the UE, generate an output comprising one or more predicted wireless measurements using a first machine learning model; wherein the first machine learning model trained by at least: obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and performing an optimization with respect to the multipath components data and the ground truth locations.

In another aspect of the present disclosure, a computer-readable apparatus is disclosed. In some embodiments, the computer-readable apparatus includes a storage medium, the storage medium comprising a plurality of instructions configured to, when executed by one or more processors, cause a computerized apparatus to: obtain a location of a user equipment (UE) within a wireless network; and given the location of the UE, generate an output comprising one or more predicted wireless measurements using a first machine learning model; wherein the first machine learning model trained by at least: obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and performing an optimization with respect to the multipath components data and the ground truth locations.

In another aspect of the present disclosure, a computerized apparatus is disclosed. In some embodiments, the computerized apparatus includes: means for obtaining a location of a user equipment (UE) of a wireless network; and means for given the location of the UE, generating an output comprising one or more predicted wireless measurements using a first machine learning model, the first machine learning model trained by utilizing at least: means for obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and means for performing an optimization with respect to the multipath components data and the ground truth locations.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
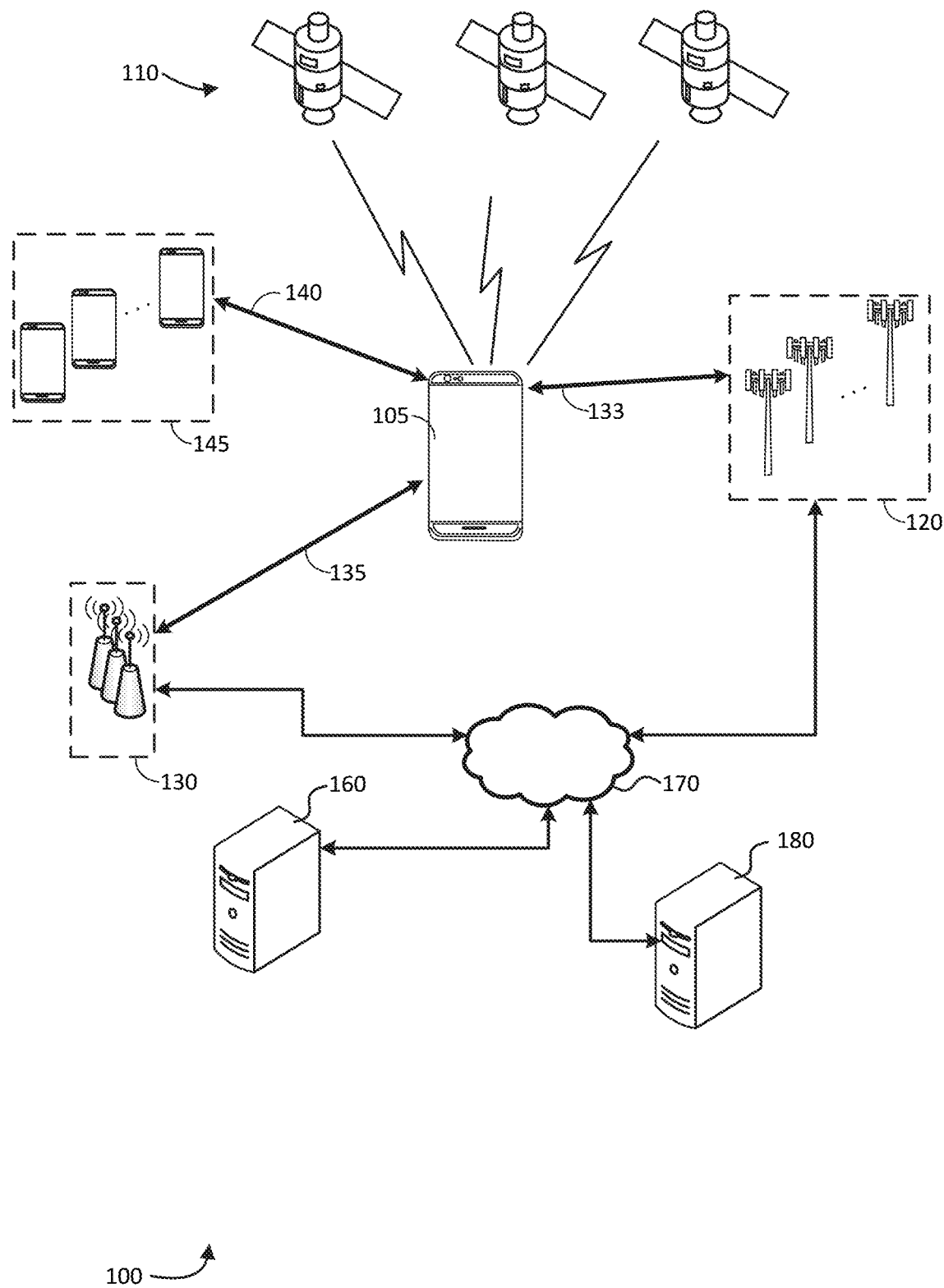
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, a "module" may refer to at least a portion of computer-executable instructions. In some embodiments, a module may be implemented by a hardware processor configured to execute the corresponding computer-executable instructions. A hardware processor may include an integrated circuit device associated with a computing device, such as a server or a user device (e.g., a UE, a desktop computer, a laptop computer, a tablet computer, a mobile phone, or the like), which is programmable to perform specific tasks. In some embodiments, multiple modules may be implemented as a single module. In some embodiments, a single module may be implemented as multiple modules. In some embodiments, two or more modules may be executable by the same device (e.g., the same server, the same computing device).

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

FIG. 1 is a simplified illustration of a positioning system 100 in which a UE 105, location server 160, and/or other components of the positioning system 100 can use the techniques provided herein for, e.g., predicting wireless measurements of UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When one or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
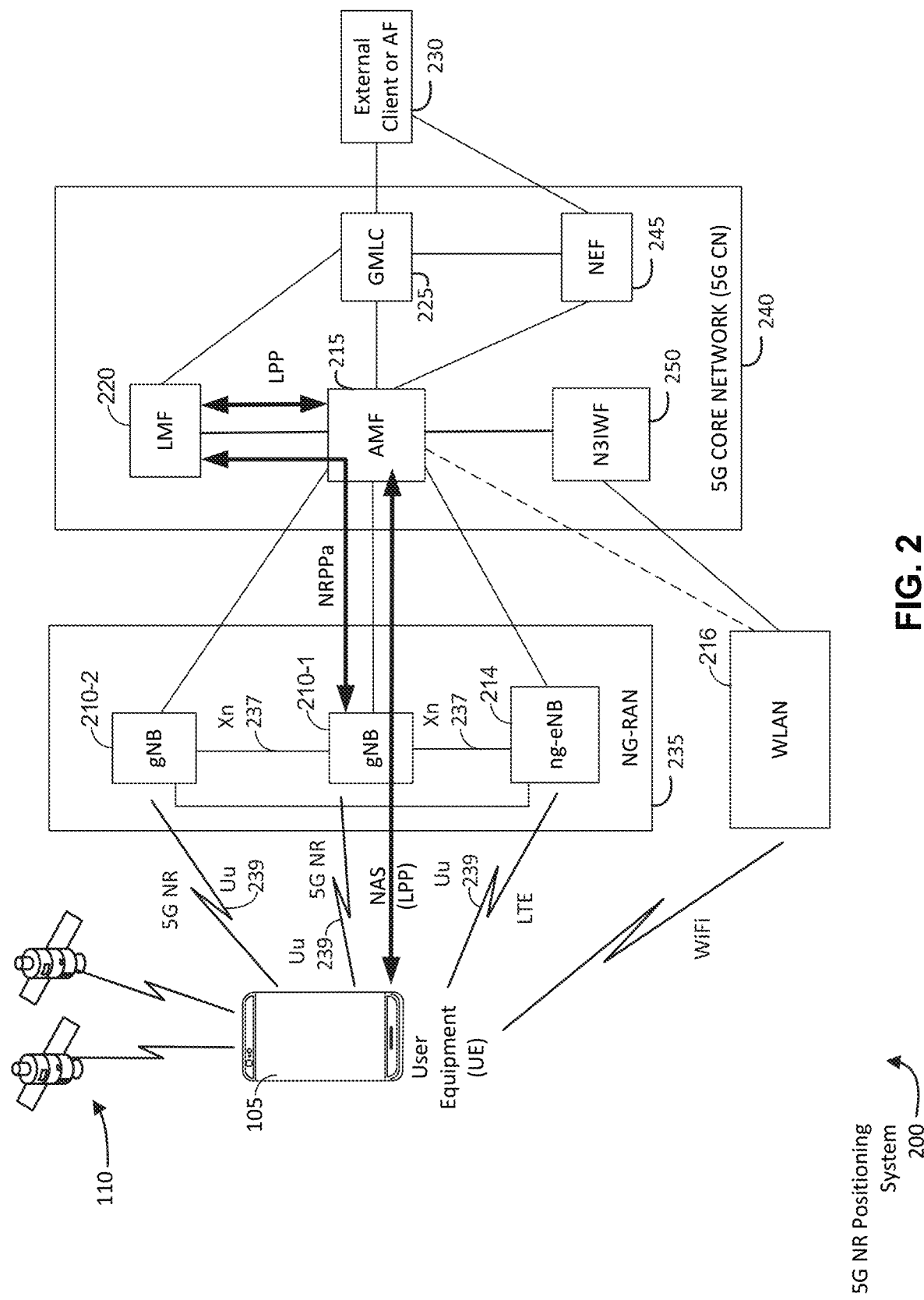
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNB s 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNB s supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Virtual Access Points

Figure 3A:
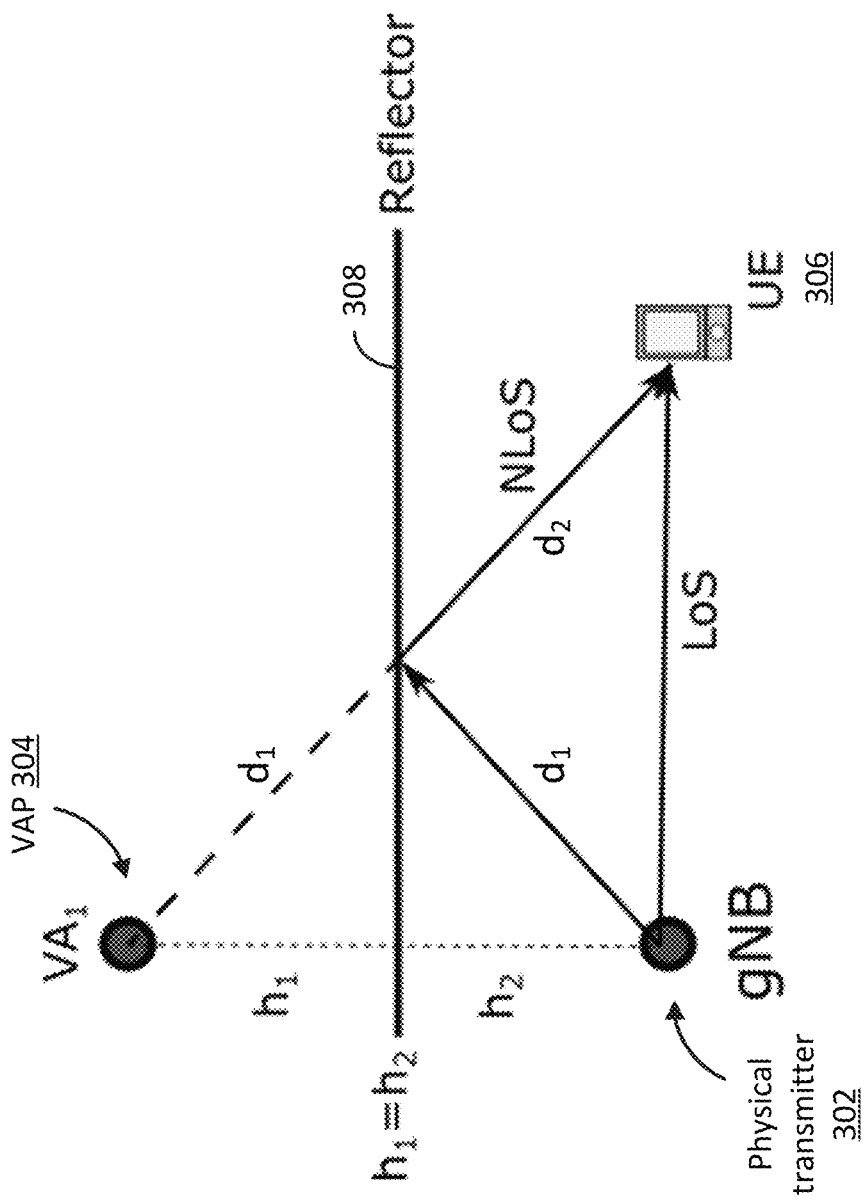
FIG. 3A is a diagram illustrating the relative positions of a physical transmitter, a virtual transmitter, and a user equipment (UE), according to some embodiments.

FIG. 3A is a diagram illustrating the relative positions of a physical transmitter 302, a virtual transmitter 304, and a UE 306, according to some embodiments. In some embodiments, the physical transmitter 302 may be an example of base station 120 or access point 130. In some embodiments, the virtual transmitter may be a "virtual access point" (VAP) 304. As discussed herein, a VAP (also referred to herein as a "virtual anchor") is a virtual, non-physical entity that may describe at least in part a RF environment such as a wireless communications network. More specifically, in some cases, a VAP may represent a location whose position is at a mirror image with respect to a reflecting surface 308. In some embodiments, the reflecting surface 308 may be a surface (such as the ground or a wall of a building) that causes electromagnetic (e.g., RF) waves to reflect from it.

As indicated in FIG. 3A, a VAP 304 is identifiable and positioned across the reflecting surface 308 as a mirror image of a physical transmitter (e.g., gNB) 302. The distance between the VAP 304 and the reflecting surface 308 is $h_1$, and the distance between physical transmitter 302 and the reflecting surface 308 is $h_2$, where $h_1$ and $h_2$ are equal. That is, a VAP is a virtual transmitter that is located at the opposite side of a reflector at the same distance the reflector is to a physical transmitter (e.g., a base station).

In some embodiments, the VAP 304 may assist in generation of non-line-of-sight (NLoS) multipath components resulting from reflection from the reflecting surface 308. NLoS multipath components may be observable by a receiver (e.g., UE 306). Multipath components may assist with positioning of the UE. As one example, a time of flight (ToF) of the NLoS path may correspond to the time of flight of the RF wave (e.g., a positioning signal) from the virtual access point to the UE. Another example of a multipath component is signal power (p) of a RF wave (e.g., a positioning signal) transmitted from the physical transmitter 302 to the UE 306.

In some embodiments, a wireless channel may be measured to compute the foregoing multipath components (e.g., ToF and/or signal power) may be computed or extracted from a measured wireless channel. In some implementations, the UE 306 may be configured to measure the ToF and/or the signal power (among other wireless measurements), and track the VAP location over time based at least on those measurements, including when the UE is mobile. In some implementations, the physical transmitter 302 may be configured to measure the ToF and/or the signal power (among other wireless measurements.

As shown in FIG. 3A, the NLoS path between a physical transmitter 302 and the UE 306, as well as the distance between the VAP 304 and the UE 306, may be described by the total distance $d_1+d_2$. As long as no change is made to the relative position of the physical transmitter 302 and the VAP 306, $d_1$ is also the distance of the path that the RF wave travels from the physical transmitter 302 to the reflecting surface 308. Since the VAP 304 is a mirror image of the physical transmitter 302, so is the path between the physical transmitter 302 and the reflecting surface 308, and the distance between the VAP 304 and the reflecting surface 308 is also $d_1$.

Although in some scenarios, a line-of-sight (LoS) path between the physical transmitter 302 and the UE 306 may exist (e.g., where there is no physical obstruction along the path), multipath is likely to exist in various scenarios. Advantageously, usage of a VAP 304 to account for multipath scenarios (e.g., where signal reflections occur) provides a solution to traditional positioning methods. Some traditional positioning methods rely on at least three LoS measurements from physical transmitters (e.g., gNBs) to estimate the position of a UE; such LoS measurements can be used for trilateration or triangulation. In many environments, however, it is possible for lines of sight to gNBs to be blocked, so there may be insufficient LoS measurements. Hence, such traditional positioning methods can fail to determine a position of the UE.

However, in some embodiments disclosed herein, depending on UE capability (e.g., capable of measuring AoA), a single measurement of AoA and ToF may be used to determine the position of a VAP. In some other embodiments, the position of a VAP can be derived by intersecting consecutive circles around the UE, each circle having a radius of measured range based on ToF. With multiple measurements, the validity of the VAP position may increase.

VAP locations may be fixed and consistent as long as the location of the physical transmitter 302 and the environment does not change. For example, as long as the physical transmitter 302 and the reflecting surface 308 remain in the same position with respect to each other, the location of the VAP 304 does not change. However, a combination of reflections from different reflectors may generate new VAPs, and multiple reflections between a physical transmitter and a UE may create multiple VAPs. Changing the location of the UE 306 also does not change the location of the VAP 304, discussed with respect to FIG. 3B below.

In some embodiments, data corresponding to aforementioned wireless measurements (ToF, signal power, etc.) and data corresponding to locations in the wireless environment (measured, e.g., by a wireless device at the location) may be used as training data for training a machine learning model, as will be described in more detail elsewhere below.

Figure 3B:
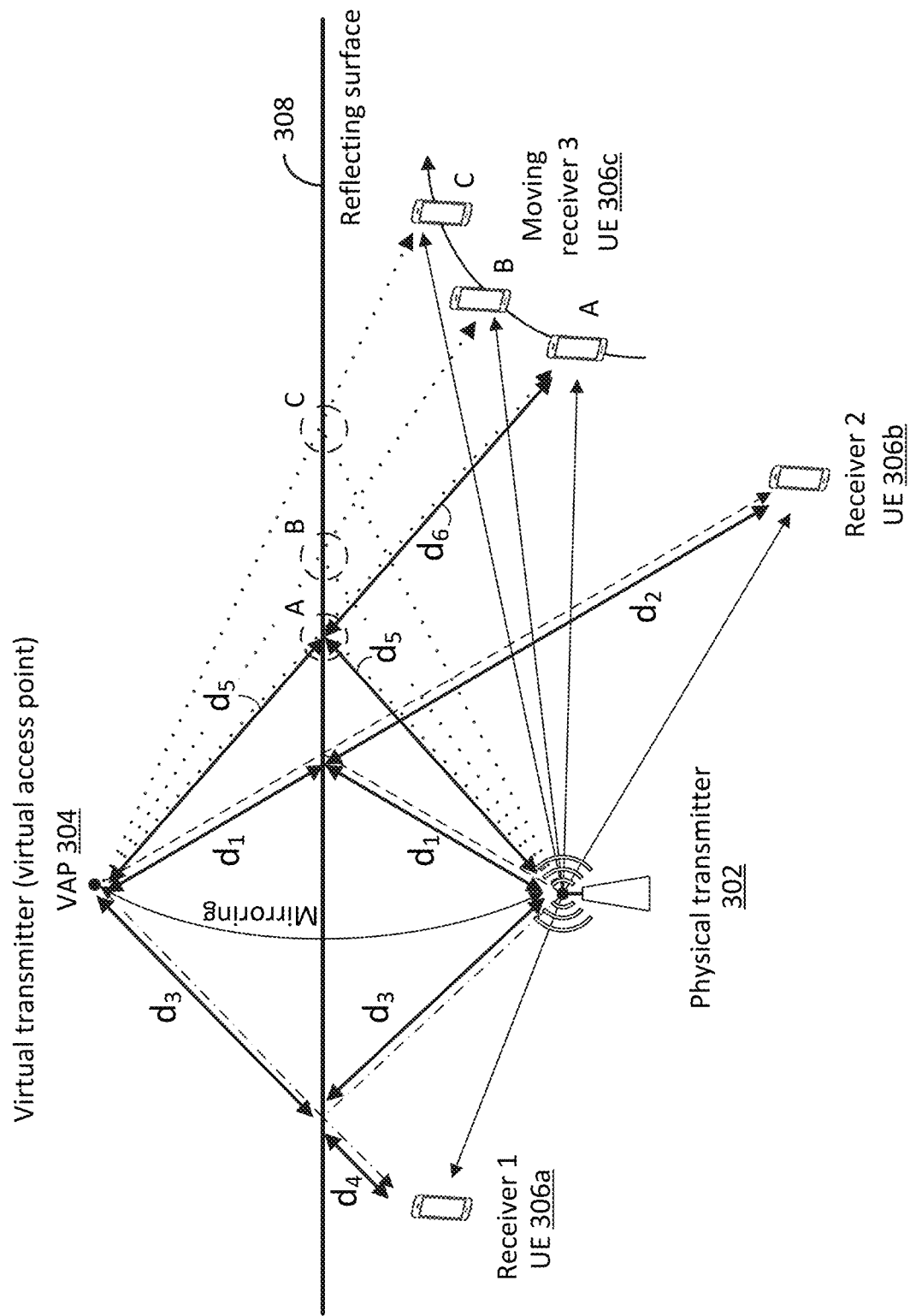
FIG. 3B is a diagram illustrating the relative positions of a physical transmitter, a virtual transmitter, and a plurality of UEs, according to some embodiments.

FIG. 3B is a diagram illustrating the relative positions of a physical transmitter 302, a virtual transmitter 304, and a plurality of UEs 306a, 306b, 306c, according to some embodiments. In some embodiments, the physical transmitter 302 comprises an access point or a base station (e.g., gNB), and the virtual transmitter 304 comprises a VAP as discussed above. FIG. 3B further depicts a first receiver (e.g., UE 306a), a second receiver (e.g., UE 306b), and a third receiver (e.g., UE 306c). In some scenarios, a receiver (e.g., UE 306c) may be moving.

Since the VAP 304 is a mirror image of the physical transmitter 302 across a reflecting surface 308, the distance $d_1$ traveled by an RF wave emitted from the physical transmitter 302 to the reflecting surface 308 is the same as the corresponding distance $d_1$ between the VAP 304 and the reflecting surface 308. Thus, the NLoS path between the physical transmitter 302 and the UE 306b, as well as the distance between the VAP 304 and the UE 306b, may be described by the total distance $d_1+d_2$. Similarly, the distance between the VAP 304 and the UE 306a and may be described by the total distance $d_3+d_4$. Similarly, the distance between the VAP 304 and the UE 306c in position A may be described by the total distance $d_5+d_6$. As the moving UE 306c moves to another position (e.g., position B or C), this total distance may change (e.g., increase as the UE 306c moves farther away from the physical transmitter 302. It can be seen that the point of reflection changes as the moving UE 306c moves. For example, as the moving UE 306c moves from position A to position B, the corresponding point of reflection is at point B rather than point A. As the moving UE 306c moves from position B to position C, the corresponding point of reflection is at point C rather than point B. Notably, the location of the VAP 304 does not change as the moving UE 306c moves, as long as the location of the physical transmitter 302 and the environment (e.g., reflecting surface 308) does not change. However, additional complexities in the environment may introduce additional VAPs, as discussed with respect to FIG. 3C.

Figure 3C:
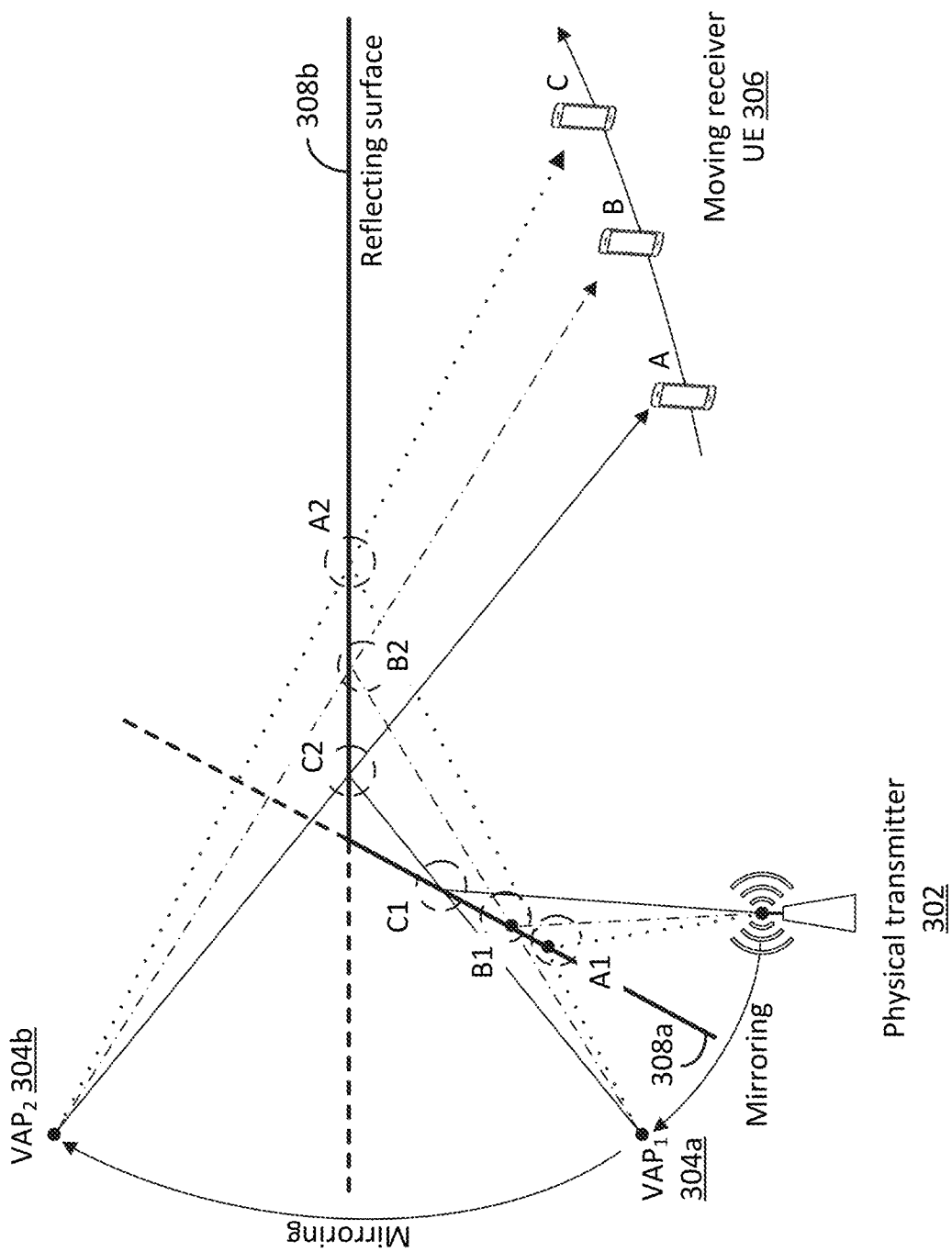
FIG. 3C is a diagram illustrating the relative positions of a physical transmitter, a plurality of virtual transmitters, and a UE, according to some embodiments.

FIG. 3C is a diagram illustrating the relative positions of a physical transmitter 302, a plurality of virtual transmitters 304a, 304b, and a UE 306, according to some embodiments. In this scenario, the physical transmitter 302 is positioned proximate to at least two reflecting surfaces 308a, 308b. When the UE 306 is in position A, an RF wave may travel from the physical transmitter 302 to a point of reflection A1 along the reflecting surface 308a, to a point of reflection A2 along the reflecting surface 308b, and then to the UE 306. The point of reflection A1 may exist between a first virtual transmitter (e.g., a first VAP 304a) and the point of reflection A2. The point of reflection A2 may exist between a second virtual transmitter (e.g., a second VAP 304b) and the UE 306.

In some cases, the UE 306 may move to location B and/or C. When the UE 306 is in position B, an RF wave may travel from the physical transmitter 302 to a point of reflection B1 along the reflecting surface 308a, to a point of reflection B2 along the reflecting surface 308b, and then to the UE 306. The point of reflection B1 may exist between the first VAP 304a and the point of reflection B2. The point of reflection B2 may exist between the second VAP 304b and the UE 306. Similarly, an RF wave may travel from the physical transmitter 302 to a point of reflection C1, to a point of reflection C2, to the UE 306. Although the UE may be associated with different locations in the environment, the locations of the VAPs 304a, 304b do not change as long as the location of the physical transmitter 302 and the environment (e.g., reflecting surfaces 308a, 308b) does not change.

In some embodiments, ToF data may be obtained based on measurements of the time taken by a signal (e.g., a positioning signal) sent by a physical transmitter (e.g., base station, access point) to a UE. In some implementations, the NLoS distance between the physical transmitter and the UE may be determined via the total distance between the corresponding VAP and the UE. Examples of the total distance may include $d_1+d_2$ as discussed with respect to FIG. 3A or 3B, or $d_5+d_6$ as discussed with respect to FIG. 3B. The ToF may therefore be determined using ToF=d/c, where $d=d_1+d_2$ (which may also be described by (UE position)—(VAP position), the distance between the UE and the VAP), and c is the speed of light. In some implementations, the signal may contain timestamp information (e.g., time of transmission) to enable measurement of ToF by the UE based on, e.g., time of receipt.

In some embodiments, signal power data may be obtained based on measurements of power at the UE. Signal power may vary depending on the location of the UE. Generally, the power may be smaller as the UE is farther from the physical transmitter, or as the signal experiences multiple reflections from surfaces. In addition, when an electromagnetic wave hits a surface, which is much longer than the wavelength of the electromagnetic wave, part of the energy of the wave is reflected, part of it is absorbed by the surface, and rest is refracted through the surface. Thus, as the wave travels farther through free space and/or becomes incident to a reflecting surface (e.g., a wall) and reflects from the surface, the loss in energy results in lower signal power detected at the UE.

Aforementioned ToF and signal power may be examples of wireless measurements which may correspond to multipath components of a wireless channel between the physical transmitter (e.g., base station) and a UE. Put another way, reflections and obstructions in NLoS paths (multipaths) between the base station and the UE may be accounted for using wireless measurements (e.g., ToF and signal power), thereby enabling determination of location information of the UE in a multipath environment. LoS paths between the base station and the UE may also be a basis for location determination of the UE. In some implementations, examples of wireless measurements that may be used may include signal power gain, delay spread (a measure of the multipath richness of a communications channel), RSRP, and/or signal-to-noise ratio (SNR). In some implementations, as noted above, AoA of a signal may also be an example of a wireless measurement used as a basis for UE location.

Furthermore, in some implementations, TDOA assistance data may be provided to a UE 105 by a location server (e.g., location server 160) for a "reference cell" (which also may be called "reference resource"), and one or more "neighbor cells" or "neighboring cells" (which also may be called a "target cell" or "target resource"), relative to the reference cell. For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to TDOA or some other position method. PRS-based positioning by a UE 105 may be facilitated by indicating the serving cell for the UE 105 in the TDOA assistance data (e.g., with the reference cell indicated as being the serving cell).

In some embodiments, TDOA assistance data may also include "expected Reference Signal Time Difference (RSTD)" parameters, which provide the UE 105 with information about the RSTD values the UE 105 is expected to measure at its current location between the reference cell and each neighbor cell, together with an uncertainty of the expected RSTD parameter. The expected RSTD, together with the associated uncertainty, may define a search window for the UE 105 within which the UE 105 is expected to measure the RSTD value. TDOA assistance information may also include PRS configuration information parameters, which allow a UE 105 to determine when a PRS positioning occasion occurs on signals received from various neighbor cells relative to PRS positioning occasions for the reference cell, and to determine the PRS sequence transmitted from various cells in order to measure a signal ToA or RSTD.

Using the RSTD measurements, the known absolute or relative transmission timing of each cell, and the known position(s) of wireless node physical transmitting antennas for the reference and neighboring cells, the UE position may be calculated (e.g., by the UE 105 or by the location server 160). More particularly, the RSTD for a neighbor cell "k" relative to a reference cell "Ref," may be given as ($ToA_k-ToA_{Ref}$), where the ToA values may be measured modulo one subframe duration (1 ms) to remove the effects of measuring different subframes at different times. ToA measurements for different cells may then be converted to RSTD measurements and sent to the location server 160 by the UE 105. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 105 position may be determined.

Machine Learning Models

Figure 4:
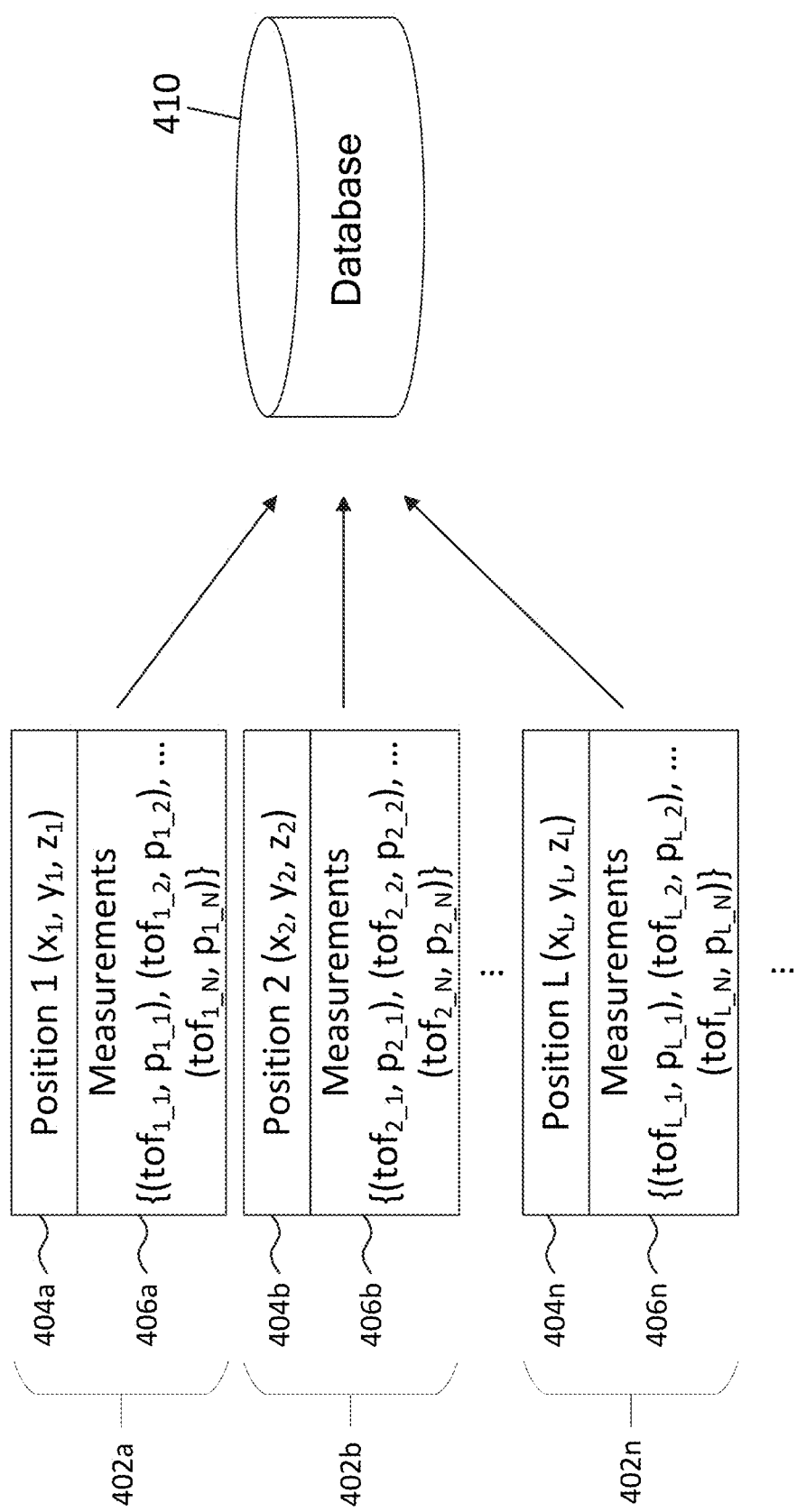
FIG. 4 is a block diagram illustrating the collection of wireless channel measurement data, according to some embodiments.

FIG. 4 is a block diagram illustrating the collection of wireless channel measurement data, according to some embodiments. In some embodiments, one or more wireless channel measurements (generally referred to herein as wireless measurements) may be obtained based on a known location of a measuring wireless device. More specifically, the one or more wireless measurements may account for, estimate, or otherwise be indicative of multipath, where a signal (e.g., a positioning signal) transmitted by a physical transmitter (e.g., an access point or a base station such as a gNB) may traverse multiple routes as it interacts with reflecting surfaces (walls, ground, objects, etc.). Hence, some wireless measurements may include or be referred to as multipath components. Some examples of wireless measurements and multipath components include ToF and signal power. However, it will be appreciated that other types of wireless measurements as discussed elsewhere herein (e.g., delay spread, RSRP, SNR) may also be collected and used to estimate multipath.

Referring to FIG. 4, in some embodiments, a first set of measurements data 402a may include position data 404a and wireless measurements data 406a. In some implementations, the wireless measurements data 406a may include one or more multipath components, such as ToF and/or power measured by a wireless device. In some implementations, the position data 404a may correspond to a measured location of the wireless device. In other words, it is the location that is known to be true, also referred to as "ground truth" location. In some implementations, the wireless device may be a mobile device (e.g., a UE or another wireless-capable device) having capabilities to (i) measure or estimate received wireless signals and/or (ii) determine its (the wireless device's) location based on, e.g., positioning techniques such as UE-based, UE-assisted, network-based, or GNSS-based position methods described above. In some cases, the location of the wireless device may be obtained from any other apparatus (e.g., a network node, a sensor, another wireless device such as another UE). In some cases, the wireless device may have a capability to (iii) determine an AoA of received signals.

In some embodiments, the measuring wireless device may obtain different known ground truth locations, included in, e.g., position data 404a, 404b, 404n. In some embodiments, locations may be described using a coordinate system (x, y, z), Cartesian, Euclidean, polar, spherical, or otherwise. In some embodiments, locations may be described relative to another wireless device or a network node. For example, the wireless device may establish one or more sidelinks with one or more anchor UEs with known locations, and a distance and an AoA and/or AoD may be used to determine a position relative to the anchor UE(s). In some cases, the absolute location may be determined based on the distance and angle from the anchor UE(s).

Returning to FIG. 4, sets of data similar to the first set of measurements data 402a may be acquired in a similar way as above, such as a second set of measurements data 402b and additional sets of measurements data up to or including a third set of measurements data 402n. Each of the sets of measurements data 402b and 402n may include respective position data (e.g., 404b, 404n) and wireless measurements data (e.g., 406b, 406n). In some embodiments, a database 410 may include the sets of measurements data. The database 410 may be a data structure configured to store the aforementioned position data and wireless measurements data in a predefined format (basic array, comma-separated values (CSV), text file, JavaScript Object Notation (JSON), Python (PY) file, etc.). In some implementations, the database 410 may be stored on the network side, such as an access point or a base station (e.g., gNB), or a server entity (e.g., location server 160, external client 180, LMF of the location server 160). In some implementations, the database 410 may be stored at the wireless device, and may be transmitted to or be accessible by the network side. In various applications, the database 410 may be used by at least one of such network entities, e.g., to train a machine learning.

Figure 5:
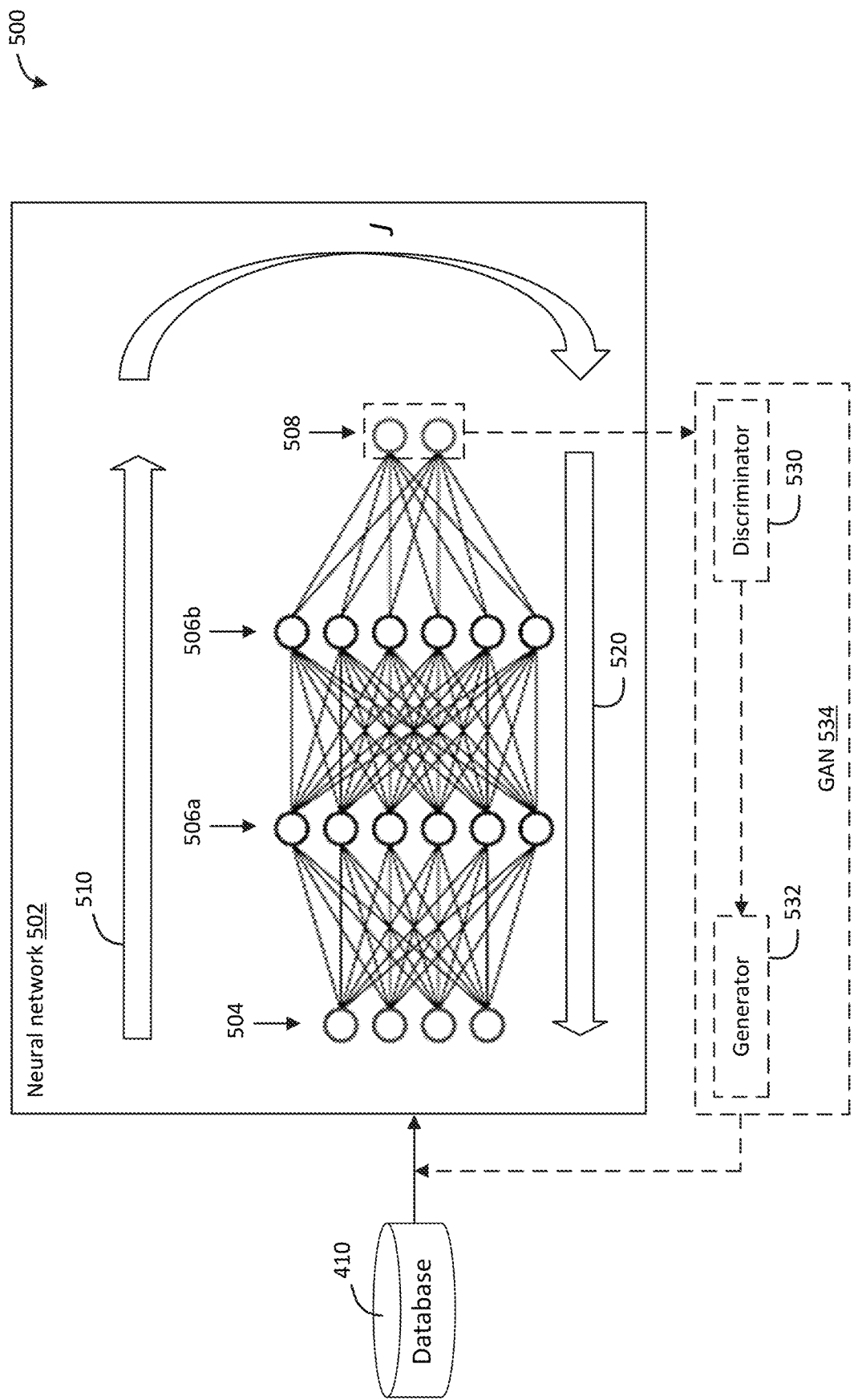
FIG. 5 is a block diagram illustrating a mechanism for training a machine learning model, according to some embodiments.

FIG. 5 is a block diagram illustrating a mechanism for training a machine learning model, according to some embodiments. In some embodiments, the training of the machine learning model may be performed by a training module 500. The training module 500 may include a neural network 502. According to some implementations, neural network 502 may include an input layer 504, an output layer 508, and one or more intermediate "hidden" layers 506a, 506b between the input and output layers. In some implementations, hidden layers may not be present between the input and output layers.

The neural network 502 may represent an algorithm, represented by the layers. Each layer may include one or more nodes, each of which may contain a value or represent a computational function that has one or more weighted input connections, a transformation function that combines the inputs in some way, and/or one or more output connections (which may in turn be input connections to other nodes). The input layer 504 may be configured to receive external data. The external data may be training data from a database (e.g., the database 410 of FIG. 4). In some implementations, a portion (e.g., 20%) of the training data may be randomly selected to be used as part of a validation set for the machine learning model. Each of the hidden layers 506a, 506b may be configured to perform at least a transformation on the inputs. The output layer 508 may be configured to produce a result of the transformations. In some implementations, the result may include predicted wireless measurement data, e.g., signal power associated with a wireless device at a given position, ToF at a given position. In some implementations, the result may include predicted locations of one or more VAPs. In some implementations, other types of wireless measurement data may be obtained (e.g., delay spread, RSRP, SNR).

As an example, one or more nodes of the input layer 504 may receive location data. For instance, an input node 504 may receive and/or store a coordinate or a component of the coordinate (e.g., x, y, or z). One or more hidden layers 506 may receive portions of the location data, apply one or more weights associated with a given connection, and produce a training output that contains a predicted signal power. A correlation may exist between the location data and the predicted signal power. The training output may contain any other wireless measurement, e.g., ToF. The process of producing an output from the input may be referred to as forward propagation 510.

In some embodiments, a modeling process may be performed, e.g., a linear regression, to improve the predictions by the machine learning model. In some embodiments, the modeling process may be logistic regression, which may determine a probability of an outcome given an input, useful for classifying an output (e.g., yes or no, 1 or 0). In linear or logistic regression, an error (J) may be determined between the output data (e.g., predicted signal power, predicted ToF) and a labeled wireless measurement (e.g., as a supervised learning process), and minimized using an optimization technique such as gradient descent. In gradient descent, the error is sought to be lowered at each iterative step until a minimum error is reached. In some implementations, linearization may be performed to reduce dimensions and/or learning rate may be set and/or adjusted. In some cases, a learning rate schedule may be set to vary the learning rate to reach the global minimum error without running into non-convergence from an overly large learning rate or being stuck in local minimum from an overly small learning rate. The process of updating the weights of the connections in the neural network 502 based on the optimization process may be referred to as backpropagation 520.

Forward propagation 510 may then be performed again with the updated connection weights, with another backpropagation 520 based thereon. This cycle may be performed one or more times by the training module 500.

In some embodiments, additional input data may be utilized with the neural network 502. More specifically, a discriminator 530 and a generator 532 may optionally be implemented with the neural network 502. A discriminator is a type of neural network configured to learn to distinguish fake data from realistic fake data that may have the same characteristics as the training data and generated by the generator 532. The discriminator 530 and the generator 532 may compete with each other, and the discriminator 530 may penalize the generator 532 for generating data that is easily recognized as implausible. By using the discriminator 530 and the generator 532 together in such a way in a generative adversarial network (GAN) 534, more realistic and plausible examples may be generated by the generator 532 over time. In this way, in some embodiments, data in addition to those collected, e.g., by the wireless device as discussed with regard to FIG. 4, may be used for training.

In some embodiments, the resulting output may include values (e.g., dB or dBm of signal power) included in a predefined format such as those noted elsewhere above. In some embodiments, the resulting output may include heatmap data that indicates the estimated or predicted wireless measurements with respect to two-dimensional (e.g., two of x, y, or z) or three-dimensional (e.g., x, y, z) location within an RF environment, e.g., associated with a wireless network. Such heatmap data may represent a collection of predictions at various locations, and may include indications of the one or more predicted wireless measurements with respect to corresponding locations of the RF environment associated with the wireless network.

In some embodiments, the training of the machine learning model may be performed at a network entity, such as an access point or a base station (e.g., gNB), or a server entity (e.g., location server 160, external client 180, LMF of the location server 160).

In some embodiments, inference (e.g., output of prediction of wireless measurements) based on a trained machine learning model may be performed at a network entity or entities. In some implementations, the resulting output generated by the network entity may be sent to a UE. In some embodiments, inference may be performed at the UE based on a trained model received from a network entity. The resulting output may then be used as part of a position method to estimate the location of the UE.

Figure 6A:
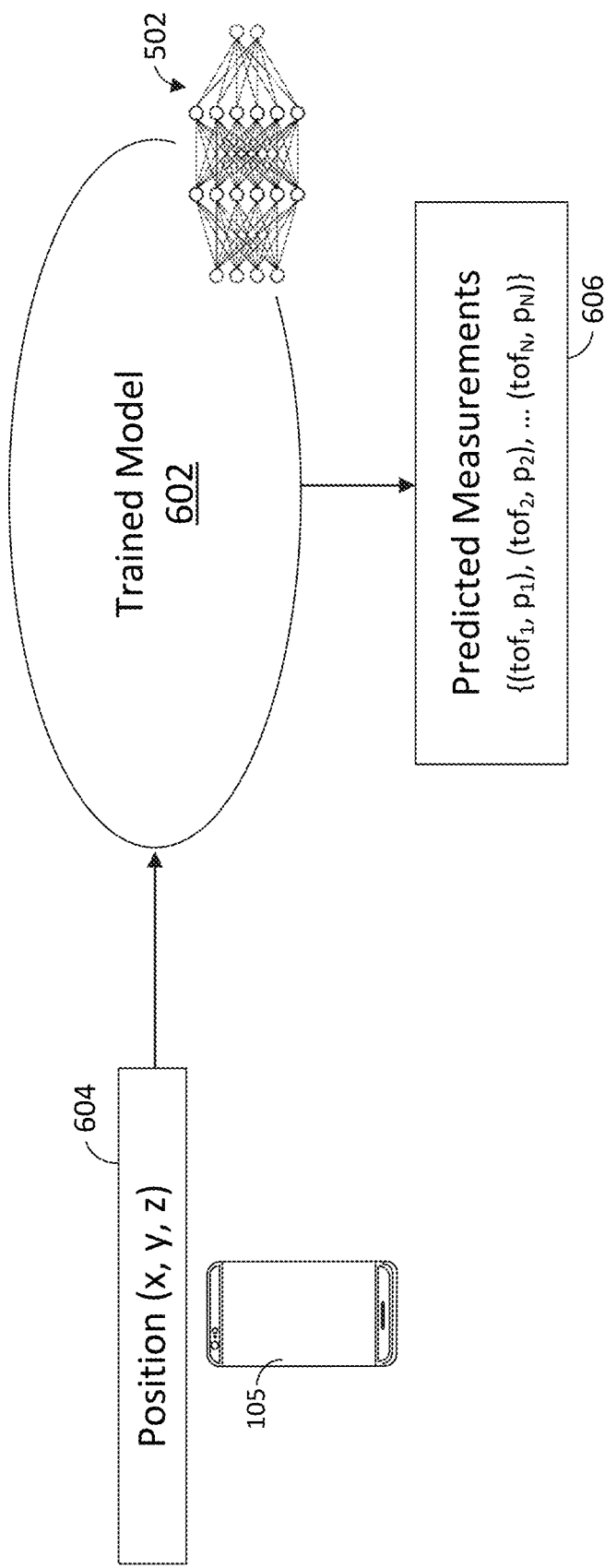
FIG. 6A is a block diagram illustrating an inference of wireless channel measurements based on a trained machine learning model, according to some embodiments.

FIG. 6A is a block diagram illustrating an inference of wireless channel measurements based on a trained machine learning model 602, according to some embodiments. In some embodiments, the trained machine learning model 602 may be configured to implement a trained neural network, such as the neural network 502 described with respect to FIG. 5 that has undergone training and/or optimization. The trained machine learning model 602 may be configured to receive input data 604, which may include position data indicative of a location of a UE 105. Based on the input data 604, the trained machine learning model 602 may produce an output 606. The output may include predicted wireless measurements 606. In some embodiments, the wireless measurements may include signal power and/or ToF. In some embodiments, the wireless measurements may include locations of VAPs.

Figure 6B:
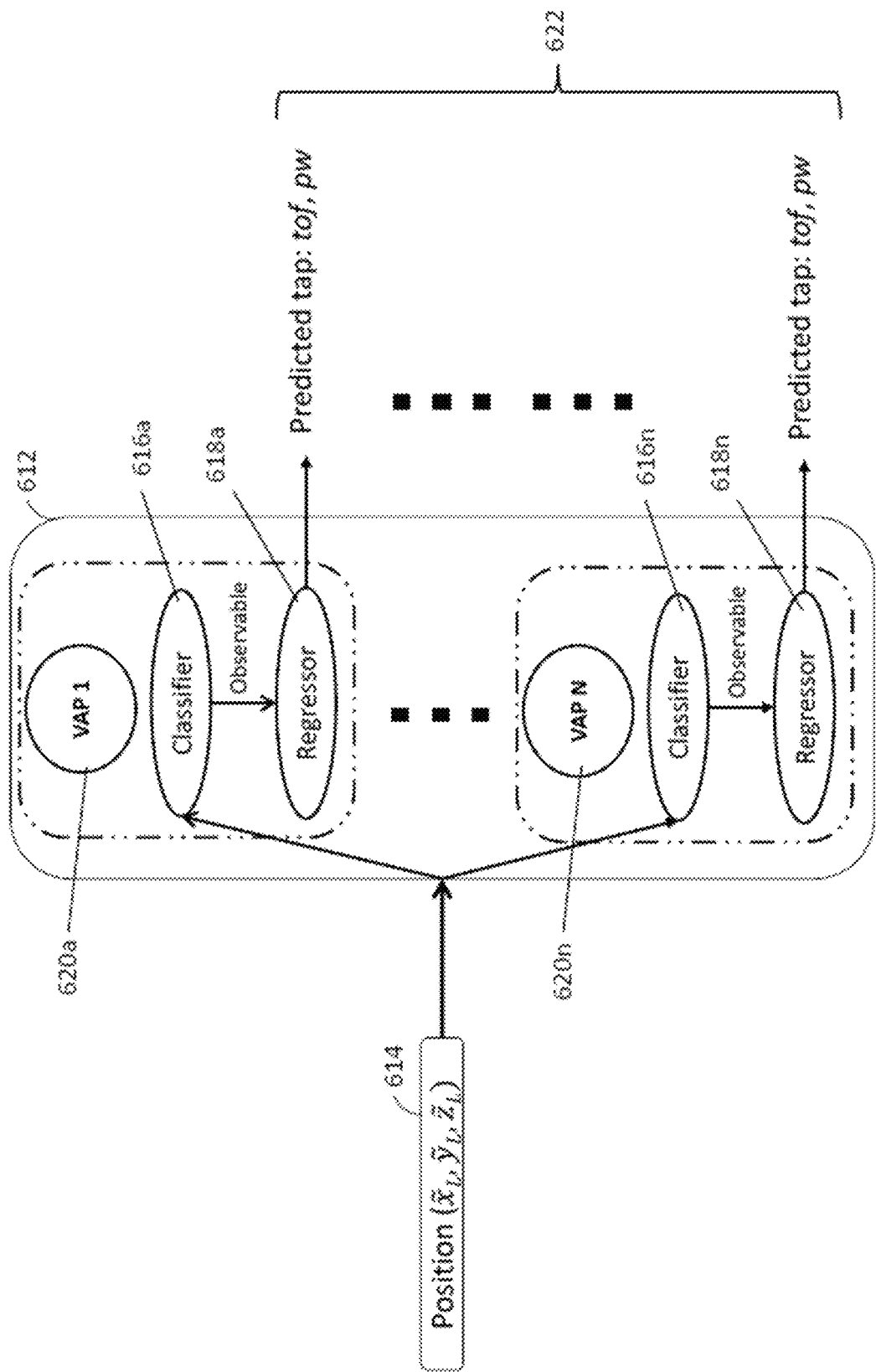
FIG. 6B is another block diagram illustrating an inference of wireless channel measurements based on a trained machine learning model, according to some embodiments.

FIG. 6B is another block diagram illustrating an inference of wireless channel measurements based on a trained machine learning model 612, according to some embodiments. In some embodiments, the trained machine learning model 612 may be configured to implement one or more trained neural networks, such as the neural network 502 described with respect to FIG. 5 that has undergone training and/or optimization.

In some embodiments, the trained machine learning model 612 may include at least one classifier 616a and at least one regressor 618a. As used herein, a classifier may refer to an algorithm or a module configured to categorize data into one or more of a set of classes (e.g., yes or no, 1 or 0). As used herein, a regressor may refer to an algorithm or a module configured to predict continuous values (e.g., wireless measurements).

Each classifier and each regressor may be associated with a respective VAP 620. In some cases, the existence of a VAP 620 may be determined based on a prediction or inference of the model 612 based on the input data 614. In some cases, the existence of a VAP 620 may be determined based on knowledge of the environment (e.g., presence of reflecting surfaces in the environment).

In some embodiments, the classifier may have been trained (e.g., according to a logistic regression model as described with respect to FIG. 5) predict an observability of a VAP 620 to a UE location. In some embodiments, the classifier may have been trained to predict an observability of the physical transmitter 302 to a UE location. In such a case, physical transmitter observability may refer to an existence of a LoS signal transmission path to the UE. In other embodiments, observability of other anchors may be predicted using the classifier. In some implementations, the observability may be classified as I/O, or yes/no, or the like.

In some embodiments, the regressor may have been trained (e.g., according to a linear regression model as described with respect to FIG. 5) predict a wireless channel measurement, such as ToF and/or signal power.

In some embodiments, each classifier and each regressor may be an instance of a single trained machined learning model. In some embodiments, each classifier and each regressor may be a separately trained machined learning model. Each instance may be generated, or each model may be trained, based on a known presence of a VAP 620.

In some embodiments, the trained machine learning model 612 may be configured to receive input data 614. In some embodiments, the input data 614 may include a plurality of position data. The position data may be received at one or more classifiers 616a, 616n for respective VAPs 620a, 620n.

In some embodiments, for each VAP, the classifier may infer observability of the VAP to a UE position. For each UE location, tap labels may represent observable VAPs to that UE location. Hence, for each VAP, a set of data, e.g., {UE position, I/O} may be generated, where I/O indicates whether the VAP or UE is observable (1) or not (0). In some embodiments, for each VAP, the regressor may be predict the signal power of a tap resulting at a UE location. For each UE location, an assigned tap to a VAP may generate data as, e.g., {UE position, signal power} for that VAP.

In some embodiments, wireless channel measurements for a UE position may be predicted only if the observability is positive (e.g., 1). A collection of wireless measurement data 622 may be obtained from the available VAPs in the environment.

Figure 6C:
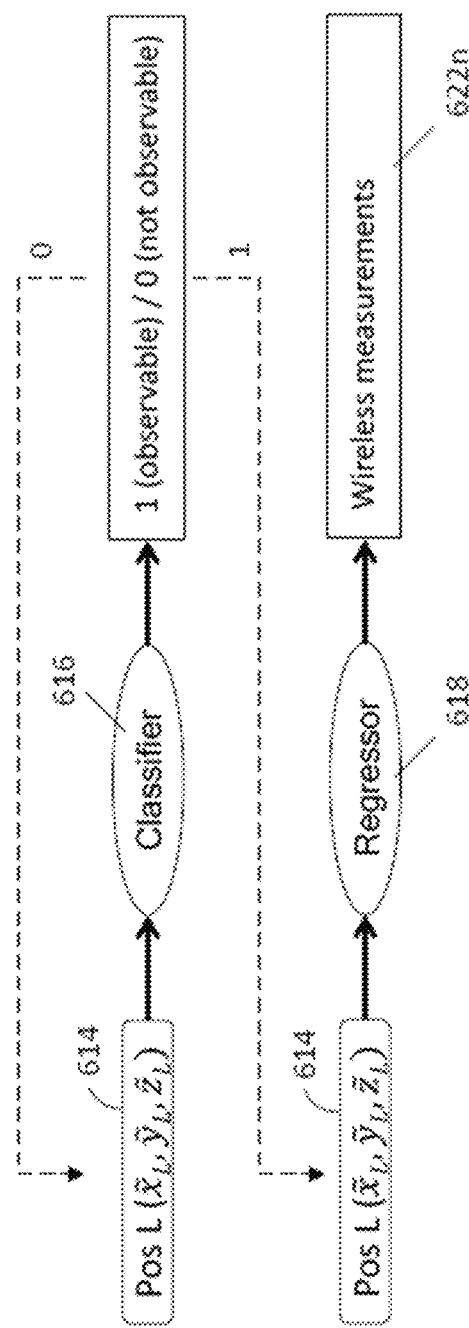
FIG. 6C is a block diagram illustrating the use of a classifier and a regressor in a machine learning model to predict and obtain wireless measurements, according to some embodiments.

FIG. 6C is a block diagram illustrating the use of the classifier 616 and the regressor 618 in a machine learning model to predict and obtain wireless measurements, according to some embodiments. As discussed above, if the classifier 616 determines that a VAP is observable ("1") at a UE location (given by received input data 614), the regressor 618 may use the input data 614 to infer wireless measurements 622n at that UE location. Examples of wireless measurements may include ToF, signal power, and others as discussed elsewhere herein. If the VAP or the UE is not observable ("0"), the wireless measurements are not predicted, estimated, or otherwise determined.

Methods

Figure 7:
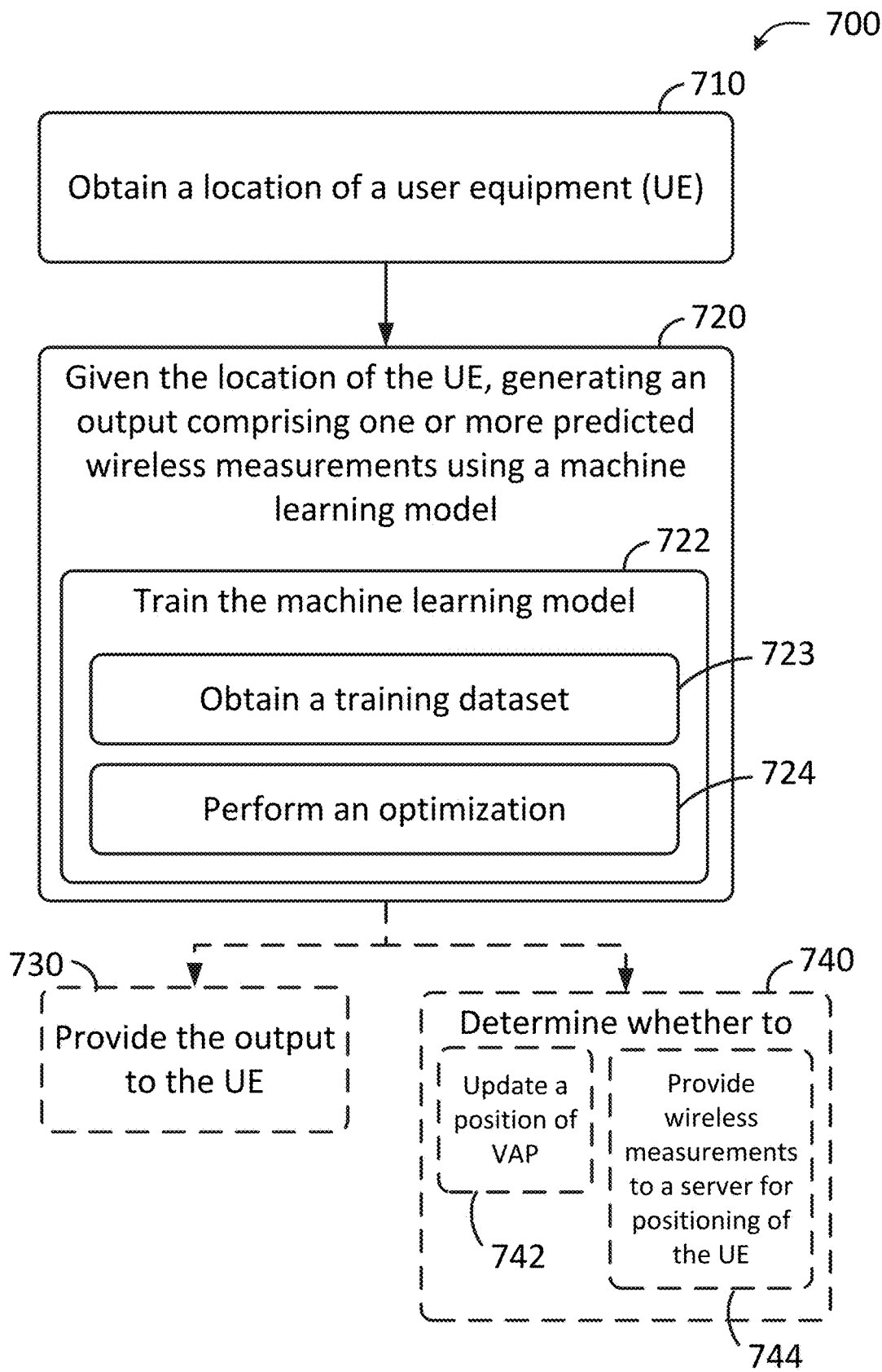
FIG. 7 is a flow diagram of a method of predicting wireless channel data associated with a UE of a wireless network, according to some embodiments.
Figure 10:
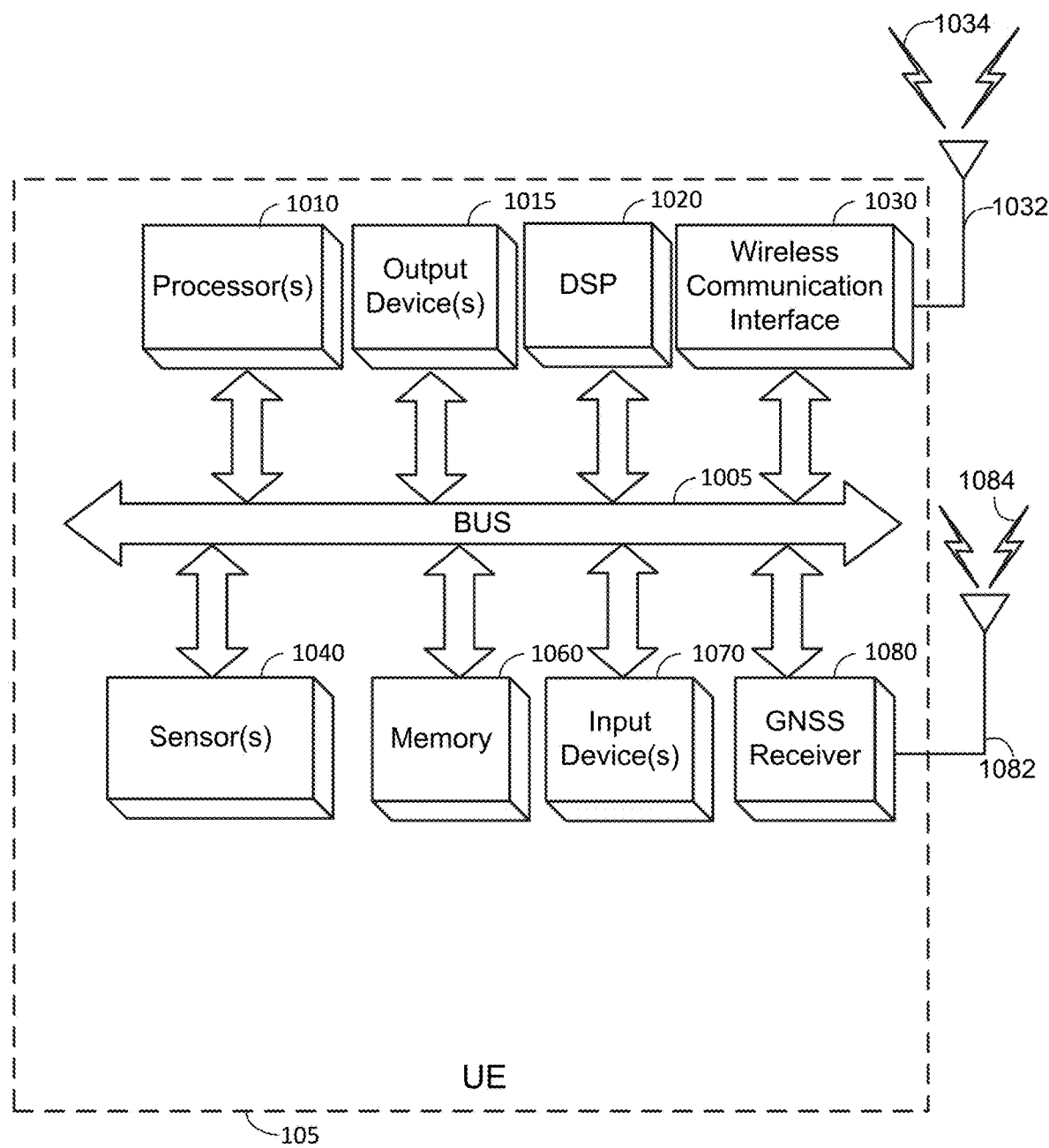
FIG. 10 is a block diagram of an embodiment of a UE, which can be utilized in embodiments as described herein.
Figure 11:
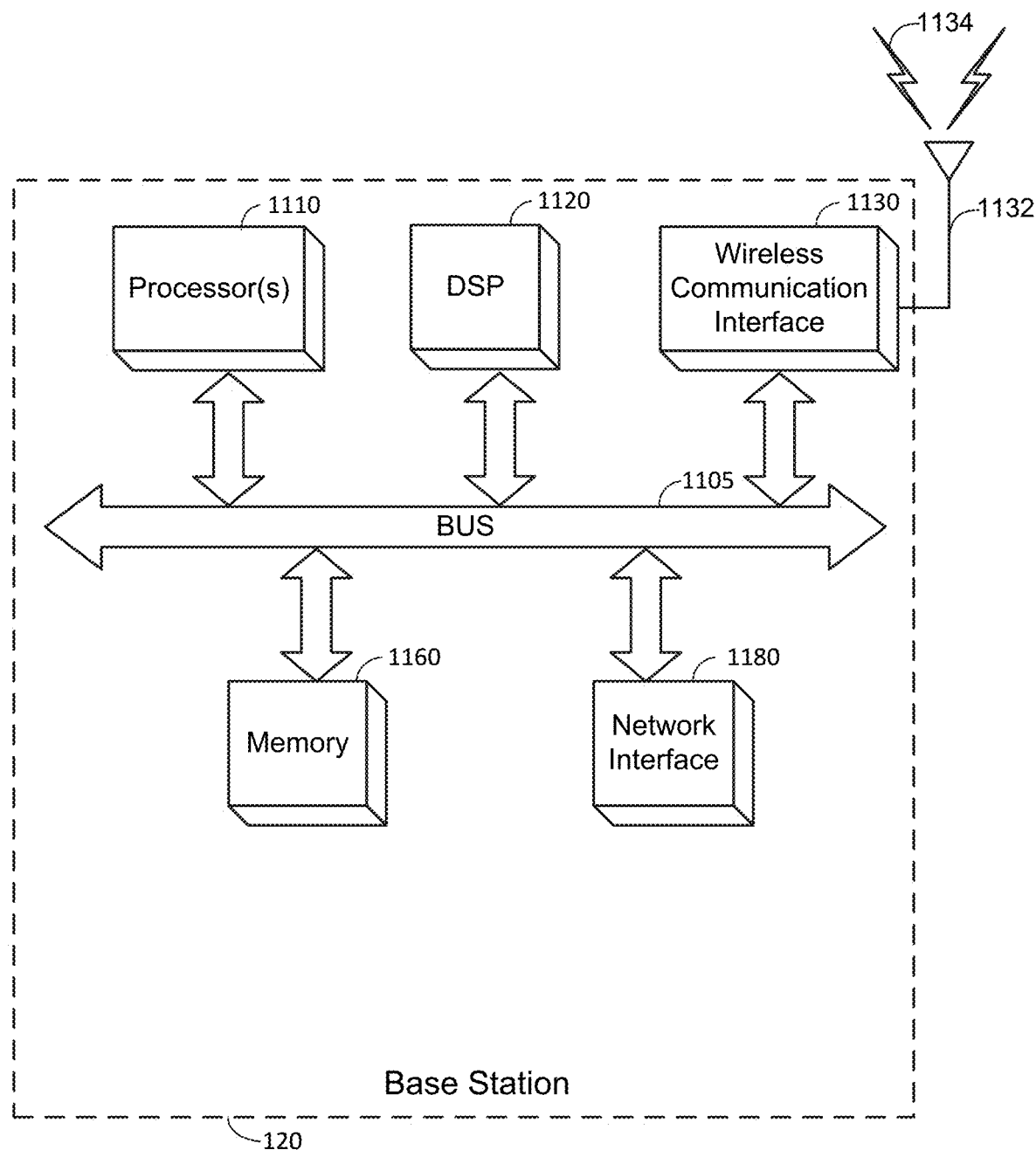
FIG. 11 is a block diagram of an embodiment of a base station, which can be utilized in embodiments as described herein.
Figure 12:
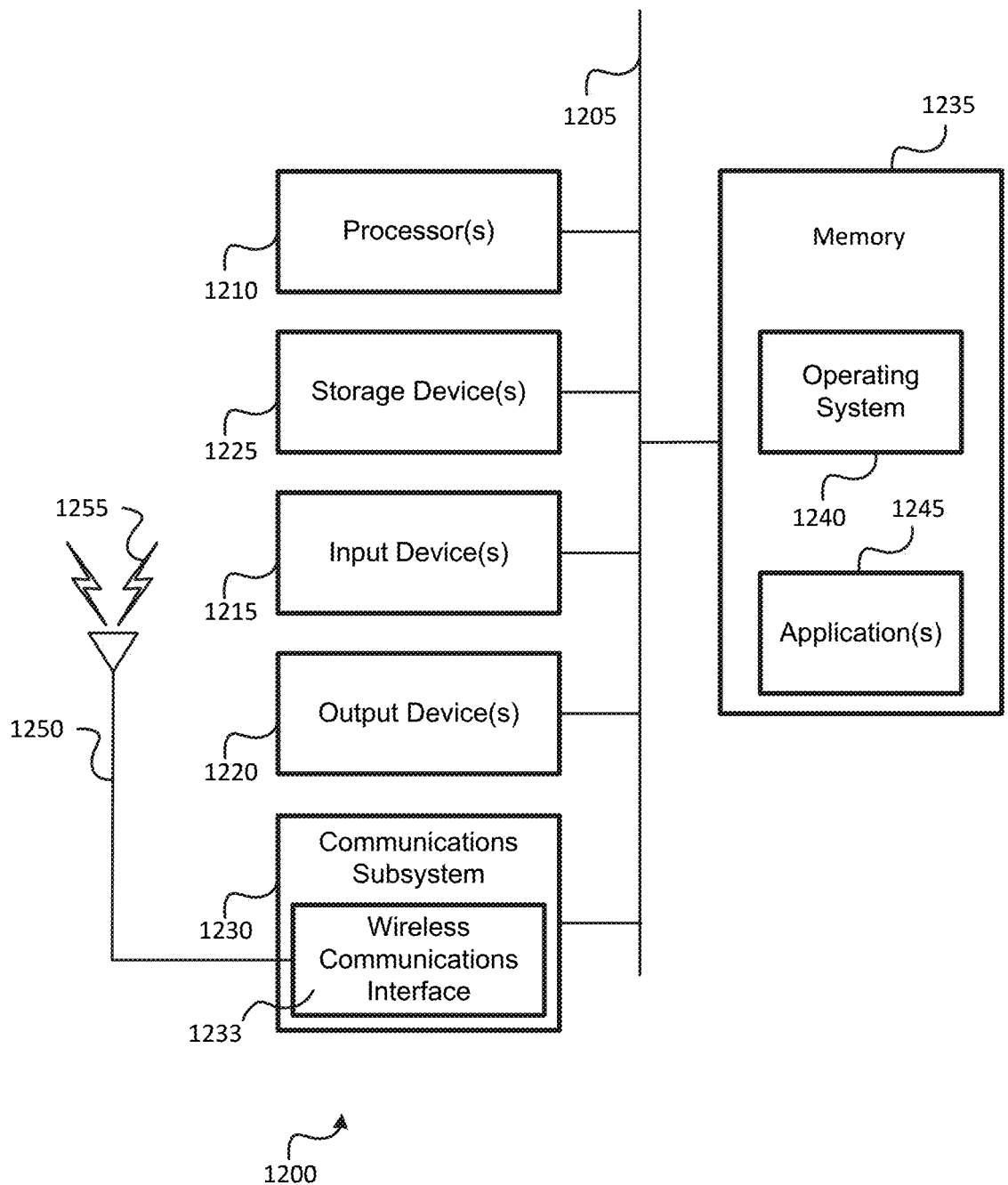
FIG. 12 is a block diagram of an embodiment of a computer system, which can be utilized in embodiments as described herein.

FIG. 7 is a flow diagram of a method 700 of predicting wireless channel data associated with a user equipment (UE) of a wireless network, according to some embodiments. Means for performing the functionality illustrated in one or more of the blocks shown in FIG. 7 may be performed by hardware (e.g., processor) and/or software components of a UE, base station, a server, or a computer-readable apparatus including a storage medium storing computer-readable and/or computer-executable instructions that are configured to, when executed by a processor apparatus, cause the at least one processor apparatus or another computerized apparatus to perform the operations. Example components of the UE, base station, and server are illustrated in FIGS. 10, 11 and 12, respectively, which are described in more detail below.

It should also be noted that the operations of the method 700 may be performed in any suitable order, not necessarily the order depicted in FIG. 7. Further, the method 700 may include additional or fewer operations than those depicted in FIG. 7 to perform the prediction.

At block 710, the method 700 may include obtaining a location of the UE. In some embodiments, at least one positioning technique such as a UE-based, UE-assisted, network-based, or GNSS-based position methods may be used to determine the location of the UE. In some embodiments, the location may already be known based on a previous measurement by the UE (e.g., using a UE-based method) or by the network (e.g., using a UE-assisted method). The known location may be stored on the network side at a network entity (e.g., base station, server, or LMF), or provided to the UE.

At block 720, the method 700 may include, given the location of the UE, generating an output comprising one or more predicted wireless measurements using a machine learning model. In some embodiments, the machine learning model may be obtained by the UE from the network entity, and implemented by the UE to generate the output at the UE. In some embodiments, the machine learning model may be implemented by the network entity to generate the output at the network entity.

In some embodiments, the machine learning model may be trained (step 722) by at least obtaining a training dataset (block 723), and performing an optimization with respect to the multipath components data and the ground truth locations (block 724).

In some implementations, the obtained training dataset may include (i) multipath components data and (ii) ground truth locations of a wireless device. The wireless device may be configured to measure multipath components, and may be separate from the UE. More directly, the wireless device may be a device used to collect training data, which may include the multipath components data and the ground truth locations of the wireless device.

In some implementations, the multipath components data may correspond to a virtual location associated with an access point (e.g., gNB or other base station configured for 3GPP-based data communication) of a wireless network. The virtual location may correspond to a virtual access point (VAP) and may include a location determined based on the location of the access point. More specifically, the VAP may be at a location that is a mirror image with respect to the location of the access point across a reflecting surface (e.g., wall) as depicted in, e.g., FIGS. 3A-3C. As such, the VAP may be correlated to one or more known locations.

In some cases, multipath components include wireless measurements that may be indicative of multipath in a NLoS signal between a transmitter (e.g., base station) and a receiver (e.g., UE), and may include time of flight (ToF) between the VAP and the wireless device. The multipath components may also include signal power (p). Other examples of multipath components may include signal power gain, delay spread, RSRP, or SNR. One of ordinary skill in the relevant art will recognize other parameters and measurements that can be used.

In some embodiments, the optimization may include a gradient descent of a regression model, which may involve minimizing error J as discussed with respect to FIG. 5. In some implementations, the regression model may produce a training output, which may include a predicted multipath component. The optimization may include an iterative minimization of an error between at least the predicted multipath component and a labeled multipath component. The optimization may include updating of weights associated with node connections via forward propagation and backpropagation. In some cases, the regression model may be a logistic regression model, which may be useful for training a classifier such as the classifier 616 and predicting a classification, e.g., observability of a VAP. In some cases, the regression model may be a linear regression model, which may be useful for training a regressor such as the regressor 618 and outputting a value for the wireless measurement.

In various implementations, potential applications of the output may include (1) estimating or predicting the wireless channel or multipath components of the wireless channel (e.g., delay spread, RSRP, SNR); (2) predictive scheduling decisions such as rank selection, allocation of a resource block (RB, which is a block of OFDM symbols and subcarriers), coordinated multipoint (CoMP) mode (CoMP may refer to the use of multiple base stations to serve one UE, and may have different modes and multiple sets of base stations that can be chosen for serving a UE; example CoMP modes include coherent and non-coherent joint transmissions) and set decision making (selecting which subsets of base stations and mode of operations based on channel conditions); (3) applications in ultra-reliable low latency communications (URLLC) that depend on prior knowledge of the channel; or (4) dynamic adaptation of communication parameters, such as reference signal (RS) pattern, periodicity of channel state feedback (CSF, which may contain metrics that indicate channel quality for feedback to the base station), cyclic prefix (CP) length, etc.

Optionally, at block 730, the method 700 may include providing the output to the UE. As mentioned above, in some embodiments, the machine learning model may have been implemented by the network entity to output the predicted wireless measurements. The output may be used by the network entity to estimate the wireless channel or multipath components of the wireless channel, or when provided to the UE, used by the UE to do the same.

Optionally, at block 740, the method 700 may include determining whether to update a position of the VAP, or provide at least one of the one or more wireless measurements to a server entity for use in positioning of the UE. In some embodiments, the newly estimated position of the VAP may be determined based on the training dataset (e.g., whether the position of the VAP is within an expected threshold range), or a heatmap generated by the machine learning model. In some implementations, the location of the VAP may also be used to determine or estimate a location of the physical transmitter as a mirror image location of the VAP. If the determined position of the VAP does not need updating, the measurements may be transmitted to a server entity (e.g., location server 160, external client 180, LMF) for use in positioning of the UE (e.g., UE-assisted positioning).

Optionally, at block 742, the method 700 may include updating a position of the virtual access point, based on the determining at block 740. Optionally, at block 744, the method 700 may include providing at least one of the one or more wireless measurements to a server for use in positioning of the UE, based on the determining at block 740. In some cases, both of the foregoing may occur.

Figure 8:
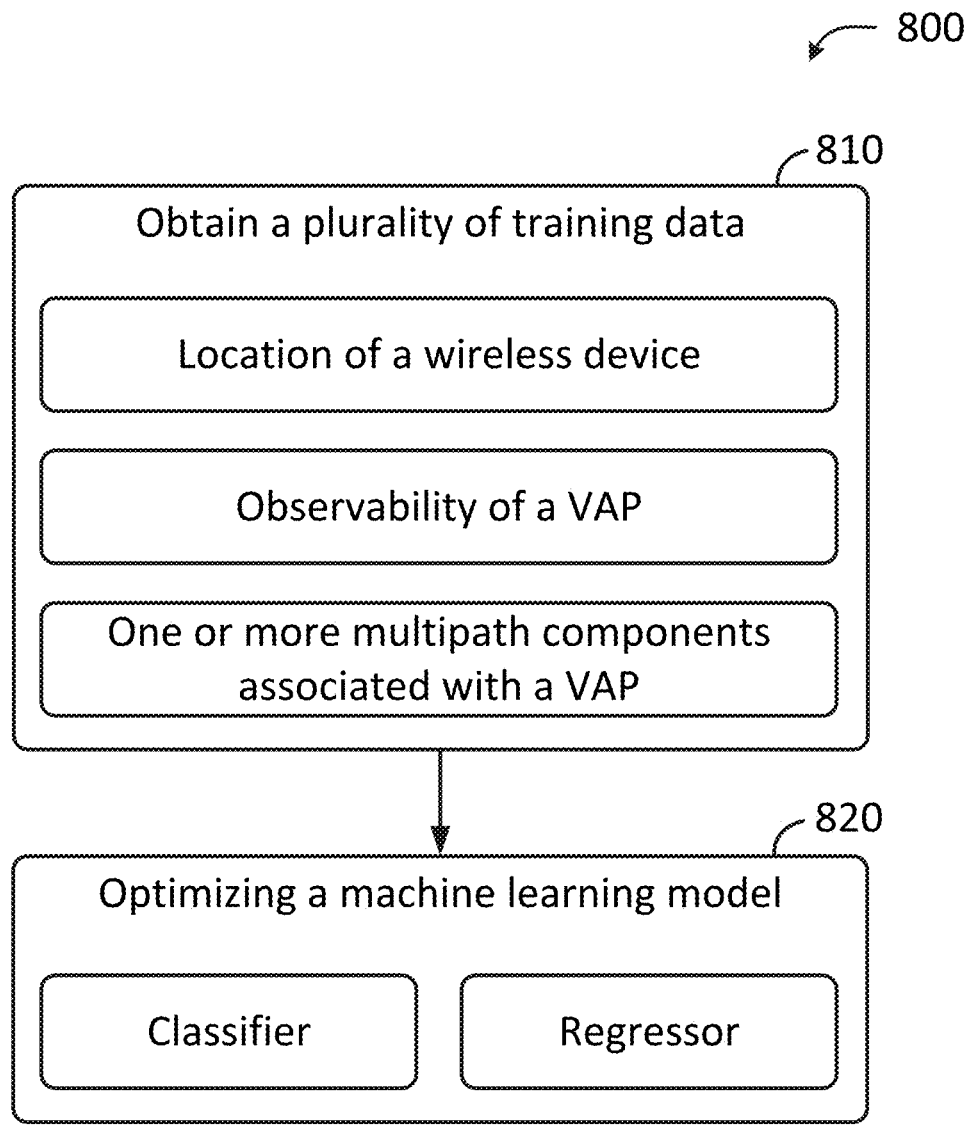
FIG. 8 is a flow diagram of a method of training a machine learning model, according to some embodiments.

FIG. 8 is a flow diagram of a method 800 of training a machine learning model, according to some embodiments. Means for performing the functionality illustrated in one or more of the blocks shown in FIG. 8 may be performed by hardware (e.g., processor) and/or software components of a base station, a server, or a computer-readable apparatus including a storage medium storing computer-readable and/or computer-executable instructions that are configured to, when executed by a processor apparatus, cause the at least one processor apparatus or another computerized apparatus to perform the operations. Example components of the base station and server are illustrated in FIGS. 11 and 12, respectively, which are described in more detail below.

It should also be noted that the operations of the method 800 may be performed in any suitable order, not necessarily the order depicted in FIG. 8. Further, the method 800 may include additional or fewer operations than those depicted in FIG. 8 to perform the training.

At block 810, the method 800 includes obtaining a plurality of training data. In some embodiments, the plurality of training data may include one or more of: (i) a location of a wireless device within a wireless network, (ii) one or more multipath components associated with at least a VAP (as discussed elsewhere herein), or (iii) an observability of the virtual access point at the location of the wireless device. A combination of the foregoing may be included with the plurality of training data. In some embodiments, the wireless device may be a mobile device (e.g., a UE or another wireless-capable device) having capabilities to (i) measure or estimate received wireless signals, (ii) determine its (the wireless device's) location, and/or (iii) determine an AoA of received signals. In some implementations, the location may be ground truth location. In some implementations, the location may be obtained from another entity other than the wireless device, such as a network entity. Note that the wireless device may be separate from a UE that will infer information, e.g., wireless measurements such as multipath components, using the model after training.

At block 820, the method 800 includes optimizing the machine learning model. In some embodiments, the optimizing may be performed using the obtained plurality of training data to obtain a trained machine learning model configured to generate a wireless parameter relating to a location of a user equipment (UE). More specifically, in some implementations, the optimizing may include gradient descent of a regression model, as described with respect to FIG. 5. In some implementations, the optimizing may include updating of weights associated with node connections via forward propagation and backpropagation.

In some embodiments, the machine learning model may be a classifier (logistic regression model) configured to predict an observability of the VAP by the UE. In some embodiments, the machine learning model may be a regressor (linear regression model) configured to predict one or more wireless measurements, e.g., ToF or signal power.

Figure 9:
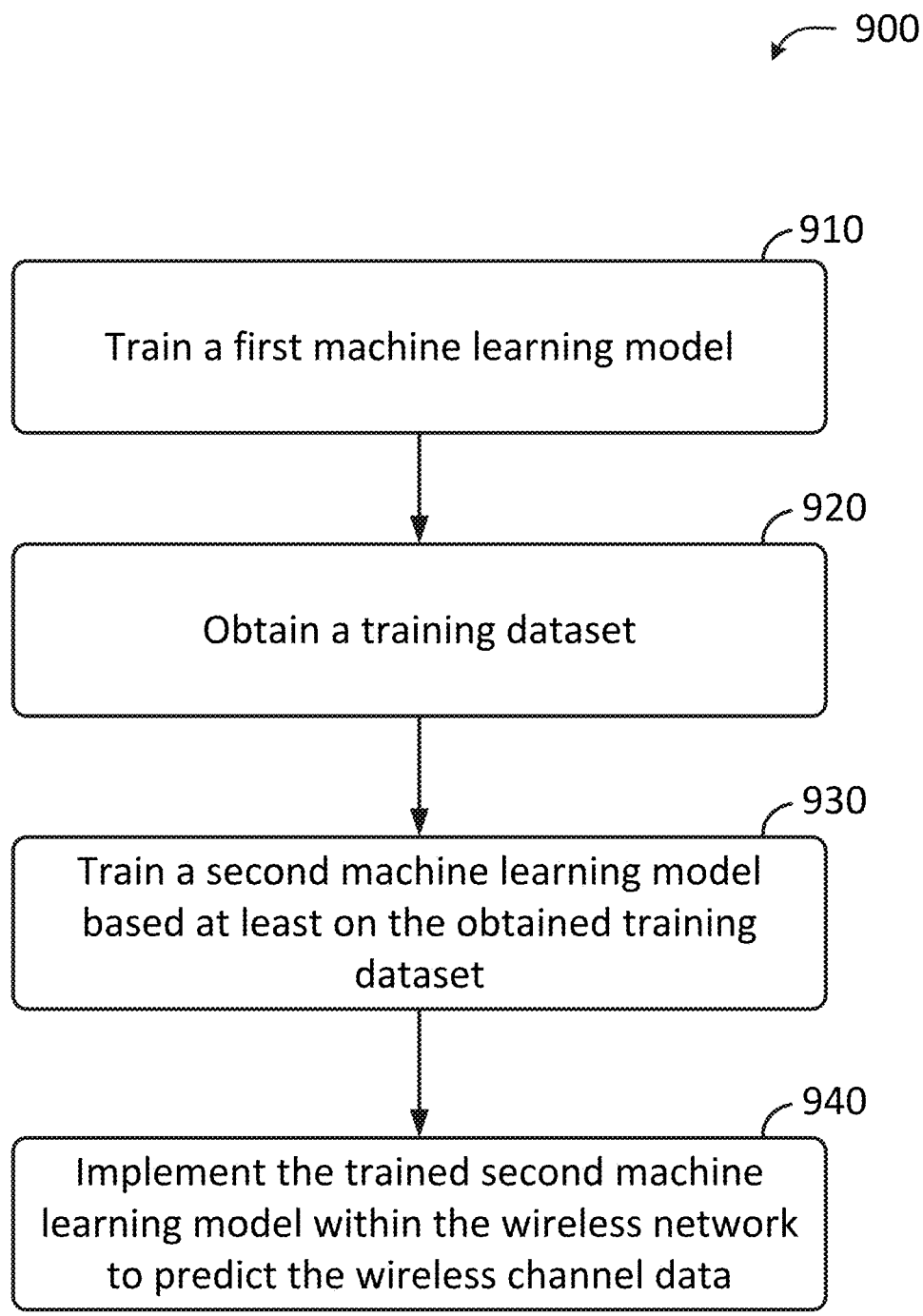
FIG. 9 a flow diagram of another method of predicting wireless channel data associated with a UE of a wireless network, according to some embodiments.

FIG. 9 is a flow diagram of a method 900 of predicting wireless channel data associated with a user equipment (UE) of a wireless network, according to some embodiments. Means for performing the functionality illustrated in one or more of the blocks shown in FIG. 9 may be performed by hardware (e.g., processor) and/or software components of a base station, a server, or a computer-readable apparatus including a storage medium storing computer-readable and/or computer-executable instructions that are configured to, when executed by a processor apparatus, cause the at least one processor apparatus or another computerized apparatus to perform the operations. Example components of the base station and server are illustrated in FIGS. 11 and 12, respectively, which are described in more detail below.

It should also be noted that the operations of the method 900 may be performed in any suitable order, not necessarily the order depicted in FIG. 9. Further, the method 800 may include additional or fewer operations than those depicted in FIG. 9 to perform the prediction.

At block 910, the method 900 may include training a first machine learning model. In some embodiments, the first machine learning model may include a classifier, such as the classifier 616 as described with respect to FIGS. 6B and 6C. Accordingly, the first machine learning model may be configured to predict an observability of a VAP to a UE location.

In some embodiments, the training may be based at least on one or more positions of a wireless device, and one or more ground truth observabilities corresponding to the one or more positions of the wireless device with respect to the virtual access point. In some implementations, the wireless device is a separate device from the UE, and may be a mobile device (e.g., a UE or another wireless-capable device) having capabilities to (i) measure or estimate received wireless signals, (ii) determine its (the wireless device's) location, and/or (iii) determine an AoA of received signals. In some implementations, the location may be ground truth location. In some implementations, the location may be obtained from another entity other than the wireless device, such as a network entity.

At block 920, the method 900 may include obtaining a training dataset. In some embodiments, the training dataset may include sets of training multipath components, the sets of training multipath components associated with a VAP, the VAP having a defined relationship to a location of an access point of the wireless network, each set of training multipath components including one or more training wireless measurements associated with the VAP. The training dataset may further include a plurality of ground truth locations associated with respective ones of the sets of multipath components.

Put another way, each VAP may have its own sets of multipath components. A given set of multipath components may include one or more of ToF, signal power, or other relevant wireless measurements. Each VAP may also be correlated to one or more known locations. Each known location may be correlated with, for example, ToF and signal power. Multiple locations may enable generation of a heatmap of ToF and/or signal power with respect to location, for example. Hence, in some implementations, each VAP may be associated with, for example, one or more known locations, one or more ToF measurements, and one or more signal power measurements, the measurements taken by, e.g., the wireless device.

At block 930, the method 900 may include training a second machine learning model based at least on the obtained training dataset. In some embodiments, the first machine learning model may include a regressor, such as the regressor 618 as described with respect to FIGS. 6B and 6C. In some embodiments, the training may be performed according to training methodologies described elsewhere herein, e.g., implementing block 722, method 800, or training module 500.

At block 940, the method 900 may include implementing the trained second machine learning model within the wireless network to predict the wireless channel data. In some embodiments, the implementing of the trained second machine learning model may include providing the trained second machine learning model to the UE, if the training has been performed at a network entity (e.g., base station, server, LMF). In some embodiments, the implementing of the trained second machine learning model may include generating a prediction of the wireless channel data. In some embodiments, the prediction of the wireless channel data may include inference of the wireless channel data. The wireless channel data may include wireless measurements, such as ToF, signal power, etc. In some embodiments, the wireless channel data may be predicted responsive to the observability of the VAP or the UE location being positive ("1"), as determined by the trained first machine learning model.

Apparatus

FIG. 10 is a block diagram of an embodiment of a UE 105, which can be utilized as described herein above (e.g., in association with FIG. 7). For example, the UE 105 can perform one or more of the functions of the method shown in FIG. 7. However, the UE may also be configured to perform one or more functions of the methods shown in FIGS. 8 and 9, such as obtaining training data (e.g., block 820 or 920) and/or predicting the wireless channel data (e.g., block 940). It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 10.

The UE 105 is shown comprising hardware elements that can be electrically coupled via a bus 1005 (or may otherwise be in communication, as appropriate). The hardware elements may include a processor(s) 1010 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1010 may comprise one or more processing units, which may be housed in a single integrated circuit (IC) or multiple ICs. As shown in FIG. 10, some embodiments may have a separate DSP 1020, depending on desired functionality. Location determination and/or other determinations based on wireless communication may be provided in the processor(s) 1010 and/or wireless communication interface 1030 (discussed below). The UE 105 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 105 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1030 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1040. Sensor(s) 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver"

may comprise hardware and/or software components configured to obtain GNSS measurements (measurements from GNSS satellites). In some embodiments, therefore, the GNSS receiver may comprise a measurement engine executed (as software) by one or more processors, such as processor(s) 1010, DSP 1020, and/or a processor within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1010 or DSP 1020.

The UE 105 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 105 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 105 (and/or processor(s) 1010 or DSP 1020 within UE 105). In some embodiments, then, such code and/or instructions can be used to configure and/or adapt a general-purpose computer (or other device) to perform one or more operations in accordance with the described methods.

FIG. 11 is a block diagram of an embodiment of a base station 120, which can be utilized as described herein above (e.g., in association with FIGS. 7-9). It should be noted that FIG. 11 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 1105 (or may otherwise be in communication, as appropriate). The hardware elements may include a processor(s) 1110 which can include without limitation one or more general-purpose processors, one or more special-purpose processors (such as DSP chips, graphics acceleration processors, ASICs, and/or the like), and/or other processing structure or means. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1130 may permit data and signaling to be communicated (e.g., transmitted and received) to UEs, other base stations/ TRPs (e.g., eNBs, gNBs, and ng-eNBs), and/or other network components, computer systems, and/or any other electronic devices described herein. The communication can be carried out via one or more wireless communication antenna(s) 1132 that send and/or receive wireless signals 1134.

The base station 120 may also include a network interface 1180, which can include support of wireline communication technologies. The network interface 1180 may include a modem, network card, chipset, and/or the like. The network interface 1180 may include one or more input and/or output communication interfaces to permit data to be exchanged with a network, communication network servers, computer systems, and/or any other electronic devices described herein.

In many embodiments, the base station 120 may further comprise a memory 1160. The memory 1160 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1160 of the base station 120 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the base station 120 (and/or processor(s) 1110 or DSP 1120 within base station 120). In some embodiments, then, such code and/or instructions can be used to configure and/or adapt a general-purpose computer (or other device) to perform one or more operations in accordance with the described methods.

FIG. 12 is a block diagram of an embodiment of a computer system 1200, which may be used, in whole or in part, to provide the functions of one or more network components as described in the embodiments herein (e.g., location server 160 of FIG. 1), and can be utilized as described herein above (e.g., in association with FIGS. 7-9). It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processor(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may comprise one or more wireless transceivers may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other TRPs, and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of predicting wireless channel data associated with a user equipment (UE) of a wireless network, the method comprising: obtaining a location of the UE; and given the location of the UE, generating an output comprising one or more predicted wireless measurements using a first machine learning model, the first machine learning model trained by at least: obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and performing an optimization with respect to the multipath components data and the ground truth locations.

Clause 2: The method of clause 1, wherein: the multipath components data comprise data corresponding to time of flight, signal power, or a combination thereof; and the one or more predicted wireless measurements comprise time of flight, signal power, or a combination thereof.

Clause 3: The method of any one of clauses 1-2 wherein the method is performed by the UE, and the method further comprises receiving, by the UE, the first machine learning model from a network entity of the wireless network.

Clause 4: The method of any one of clauses 1-3 wherein the method is performed by a base station configured for Third Generation Partnership Project (3GPP)-based data communication, and the method further comprises sending, by the base station, the output comprising the one or more predicted wireless measurements to the UE.

Clause 5: The method of any one of clauses 1-4 further comprising determining, using a second machine learning model, an observability of the virtual access point to the UE; wherein the generating of the output comprising the one or more predicted wireless measurements is performed responsive to the observability of the virtual access point being positive.

Clause 6: The method of any one of clauses 1-5 wherein the first machine learning model comprises a regressor, and the second machine learning model comprises a classifier, the classifier trained using a training dataset comprising (i) the multipath components data, (ii) the ground truth locations of the wireless device, and (iii) observabilities of virtual access points to the wireless device.

Clause 7: The method of any one of clauses 1-6 wherein the output comprises a heatmap, the heatmap comprising indications of the one or more predicted wireless measurements with respect to corresponding locations of a radio frequency (RF) environment associated with the wireless network.

Clause 8: The method of any one of clauses 1-7 wherein the location of the virtual access point is at a distance from a reflecting surface to the virtual access point, the distance being equal to a distance from the reflecting surface to the location of the access point.

Clause 9: The method of any one of clauses 1-8 wherein the first machine learning model is further trained by producing a training output, the training output comprising a predicted multipath component; and the optimization comprises an iterative minimization of an error between at least the predicted multipath component and a labeled multipath component.

Clause 10: The method of any one of clauses 1-9 further comprising, based on the predicted one or more wireless measurements, updating a position of the virtual access point, or providing at least one of the one or more wireless measurements to a server for use in positioning of the UE.

Clause 11: A network node within a wireless network, the network node comprising: at least one wireless communication interface; memory; and one or more processors communicatively coupled to the at least one wireless communication interface and the memory, the one or more processors configured to: obtain a location of a user equipment (UE); and given the location of the UE, generate an output comprising one or more predicted wireless measurements using a first machine learning model; wherein the first machine learning model trained by at least: obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and performing an optimization with respect to the multipath components data and the ground truth locations.

Clause 12: The network node of clause 11, wherein: the multipath components data comprise data corresponding to time of flight, signal power, or a combination thereof; and the one or more predicted wireless measurements comprise time of flight, signal power, or a combination thereof.

Clause 13: The network node of any one of clauses 11-12 wherein the network node is configured for Third Generation Partnership Project (3GPP)-based data communication; and the one or more processors are further configured to send, by the network node, the output comprising the one or more predicted wireless measurements to the UE via the at least one wireless communication interface.

Clause 14: The network node of any one of clauses 11-13 wherein the one or more processors are further configured to determine, using a second machine learning model, an observability of the virtual access point to the UE; and the generation of the output comprising the one or more predicted wireless measurements is performed responsive to the observability of the virtual access point being positive.

Clause 15: The network node of any one of clauses 11-14 wherein the first machine learning model comprises a regressor, and the second machine learning model comprises a classifier, the classifier trained using a training dataset comprising (i) the multipath components data, (ii) the ground truth locations of the wireless device, and (iii) observabilities of virtual access points to the wireless device.

Clause 16: The network node of any one of clauses 11-15 wherein the output comprises a heatmap, the heatmap comprising indications of the one or more predicted wireless measurements with respect to corresponding locations of a radio frequency (RF) environment associated with the wireless network.

Clause 17: The network node of any one of clauses 11-16 wherein the location of the virtual access point is at a distance from a reflecting surface to the virtual access point, the distance being equal to a distance from the reflecting surface to the location of the access point.

Clause 18: The network node of any one of clauses 11-17 wherein the first machine learning model is further trained by producing a training output, the training output comprising a predicted multipath component; and the optimization comprises an iterative minimization of an error between at least the predicted multipath component and a labeled multipath component.

Clause 19: A computer-readable apparatus comprising a storage medium, the storage medium comprising a plurality of instructions configured to, when executed by one or more processors, cause a computerized apparatus to: obtain a location of a user equipment (UE) within a wireless network; and given the location of the UE, generate an output comprising one or more predicted wireless measurements using a first machine learning model; wherein the first machine learning model trained by at least: obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and performing an optimization with respect to the multipath components data and the ground truth locations.

Clause 20: The computer-readable apparatus of clause 19, wherein: the multipath components data comprise data corresponding to time of flight, signal power, or a combination thereof; and the one or more predicted wireless measurements comprise time of flight, signal power, or a combination thereof.

Clause 21: The computer-readable apparatus of any one of clauses 19-20 wherein the computerized apparatus comprises the UE; and the plurality of instructions are further configured to, when executed by the one or more processors, cause the UE to receive the first machine learning model from a network entity of the wireless network.

Clause 22: The computer-readable apparatus of any one of clauses 19-21 wherein the computerized apparatus comprises a base station configured for Third Generation Partnership Project (3GPP)-based data communication; and the plurality of instructions are further configured to, when executed by the one or more processors, cause the base station to send the output comprising the one or more predicted wireless measurements to the UE.

Clause 23: The computer-readable apparatus of any one of clauses 19-22 wherein the plurality of instructions are further configured to, when executed by the one or more processors, cause the computerized apparatus to determine, using a second machine learning model, an observability of the virtual access point to the UE; and the generation of the output comprising the one or more predicted wireless measurements is performed responsive to the observability of the virtual access point being positive.

Clause 24: The computer-readable apparatus of any one of clauses 19-23 wherein the first machine learning model comprises a regressor, and the second machine learning model comprises a classifier, the classifier trained using a training dataset comprising (i) the multipath components data, (ii) the ground truth locations of the wireless device, and (iii) observabilities of virtual access points to the wireless device.

Clause 25: The computer-readable apparatus of any one of clauses 19-24 wherein the output comprises a heatmap, the heatmap comprising indications of the one or more predicted wireless measurements with respect to corresponding locations of a radio frequency (RF) environment associated with the wireless network.

Clause 26: The computer-readable apparatus of any one of clauses 19-25 wherein the location of the virtual access point is at a distance from a reflecting surface to the virtual access point, the distance being equal to a distance from the reflecting surface to the location of the access point.

Clause 27: The computer-readable apparatus of any one of clauses 19-26 wherein the first machine learning model is further trained by producing a training output, the training output comprising a predicted multipath component; and the optimization comprises an iterative minimization of an error between at least the predicted multipath component and a labeled multipath component.

Clause 28: A computerized apparatus comprising: means for obtaining a location of a user equipment (UE) of a wireless network; and means for given the location of the UE, generating an output comprising one or more predicted wireless measurements using a first machine learning model, the first machine learning model trained by utilizing at least: means for obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and means for performing an optimization with respect to the multipath components data and the ground truth locations.

Clause 29: The computerized apparatus of clause 28, wherein: the multipath components data comprise data corresponding to time of flight, signal power, or a combination thereof; and the one or more predicted wireless measurements comprise time of flight, signal power, or a combination thereof.

Clause 30: The computerized apparatus of any one of clauses 28-29 wherein the computerized apparatus further comprises means for determining, using a second machine learning model, an observability of the virtual access point to the UE; the first machine learning model comprises a regressor, and the second machine learning model comprises a classifier, the classifier trained using a training dataset comprising (i) the multipath components data, (ii) the ground truth locations of the wireless device, and (iii) observabilities of virtual access points to the wireless device; and the generating of the output comprising the one or more predicted wireless measurements is performed responsive to the observability of the virtual access point being positive.

What is claimed is:

1. A method of predicting wireless channel data associated with a user equipment (UE) of a wireless network, the method comprising:
   obtaining a location of the UE; and
   given the location of the UE, generating an output comprising one or more predicted wireless measurements using a first machine learning model, the first machine learning model trained by at least:
      obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and
      performing an optimization with respect to the multipath components data and the ground truth locations.

2. The method of claim 1, wherein:
   the multipath components data comprise data corresponding to time of flight, signal power, or a combination thereof; and
   the one or more predicted wireless measurements comprise time of flight, signal power, or a combination thereof.

3. The method of claim 1, wherein the method is performed by the UE, and the method further comprises receiving, by the UE, the first machine learning model from a network entity of the wireless network.

4. The method of claim 1, wherein the method is performed by a base station configured for Third Generation Partnership Project (3GPP)-based data communication, and the method further comprises sending, by the base station, the output comprising the one or more predicted wireless measurements to the UE.

5. The method of claim 1, further comprising determining, using a second machine learning model, an observability of the virtual access point to the UE;
   wherein the generating of the output comprising the one or more predicted wireless measurements is performed responsive to the observability of the virtual access point being positive.

6. The method of claim 5, wherein the first machine learning model comprises a regressor, and the second machine learning model comprises a classifier, the classifier trained using a training dataset comprising (i) the multipath components data, (ii) the ground truth locations of the wireless device, and (iii) observabilities of virtual access points to the wireless device.

7. The method of claim 1, wherein the output comprises a heatmap, the heatmap comprising indications of the one or more predicted wireless measurements with respect to corresponding locations of a radio frequency (RF) environment associated with the wireless network.

8. The method of claim 1, wherein the location of the virtual access point is at a distance from a reflecting surface to the virtual access point, the distance being equal to a distance from the reflecting surface to the location of the access point.

9. The method of claim 1, wherein:
   the first machine learning model is further trained by producing a training output, the training output comprising a predicted multipath component; and
   the optimization comprises an iterative minimization of an error between at least the predicted multipath component and a labeled multipath component.

10. The method of claim 1, further comprising, based on the predicted one or more wireless measurements, updating a position of the virtual access point, or providing at least one of the one or more wireless measurements to a server for use in positioning of the UE.

11. A network node within a wireless network, the network node comprising:
   at least one wireless communication interface;
   memory; and
   one or more processors communicatively coupled to the at least one wireless communication interface and the memory, the one or more processors configured to:
      obtain a location of a user equipment (UE); and
      given the location of the UE, generate an output comprising one or more predicted wireless measurements using a first machine learning model;
   wherein the first machine learning model trained by at least:
      obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and
      performing an optimization with respect to the multipath components data and the ground truth locations.

12. The network node of claim 11, wherein:
   the multipath components data comprise data corresponding to time of flight, signal power, or a combination thereof; and
   the one or more predicted wireless measurements comprise time of flight, signal power, or a combination thereof.

13. The network node of claim 11, wherein:
   the network node is configured for Third Generation Partnership Project (3GPP)-based data communication; and
   the one or more processors are further configured to send, by the network node, the output comprising the one or more predicted wireless measurements to the UE via the at least one wireless communication interface.

14. The network node of claim 11, wherein:
   the one or more processors are further configured to determine, using a second machine learning model, an observability of the virtual access point to the UE; and
   the generation of the output comprising the one or more predicted wireless measurements is performed responsive to the observability of the virtual access point being positive.

15. The network node of claim 14, wherein the first machine learning model comprises a regressor, and the second machine learning model comprises a classifier, the classifier trained using a training dataset comprising (i) the multipath components data, (ii) the ground truth locations of the wireless device, and (iii) observabilities of virtual access points to the wireless device.

16. The network node of claim 11, wherein the output comprises a heatmap, the heatmap comprising indications of the one or more predicted wireless measurements with respect to corresponding locations of a radio frequency (RF) environment associated with the wireless network.

17. The network node of claim 11, wherein the location of the virtual access point is at a distance from a reflecting surface to the virtual access point, the distance being equal to a distance from the reflecting surface to the location of the access point.

18. The network node of claim 11, wherein:
the first machine learning model is further trained by producing a training output, the training output comprising a predicted multipath component; and
the optimization comprises an iterative minimization of an error between at least the predicted multipath component and a labeled multipath component.

19. A computer-readable apparatus comprising a storage medium, the storage medium comprising a plurality of instructions configured to, when executed by one or more processors, cause a computerized apparatus to:
obtain a location of a user equipment (UE) within a wireless network; and
given the location of the UE, generate an output comprising one or more predicted wireless measurements using a first machine learning model;
wherein the first machine learning model trained by at least:
obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and
performing an optimization with respect to the multipath components data and the ground truth locations.

20. The computer-readable apparatus of claim 19, wherein:
the multipath components data comprise data corresponding to time of flight, signal power, or a combination thereof; and
the one or more predicted wireless measurements comprise time of flight, signal power, or a combination thereof.

21. The computer-readable apparatus of claim 19, wherein:
the computerized apparatus comprises the UE; and
the plurality of instructions are further configured to, when executed by the one or more processors, cause the UE to receive the first machine learning model from a network entity of the wireless network.

22. The computer-readable apparatus of claim 19, wherein:
the computerized apparatus comprises a base station configured for Third Generation Partnership Project (3GPP)-based data communication; and
the plurality of instructions are further configured to, when executed by the one or more processors, cause the base station to send the output comprising the one or more predicted wireless measurements to the UE.

23. The computer-readable apparatus of claim 19, wherein:
the plurality of instructions are further configured to, when executed by the one or more processors, cause the computerized apparatus to determine, using a second machine learning model, an observability of the virtual access point to the UE; and
the generation of the output comprising the one or more predicted wireless measurements is performed responsive to the observability of the virtual access point being positive.

24. The computer-readable apparatus of claim 23, wherein the first machine learning model comprises a regressor, and the second machine learning model comprises a classifier, the classifier trained using a training dataset comprising (i) the multipath components data, (ii) the ground truth locations of the wireless device, and (iii) observabilities of virtual access points to the wireless device.

25. The computer-readable apparatus of claim 19, wherein the output comprises a heatmap, the heatmap comprising indications of the one or more predicted wireless measurements with respect to corresponding locations of a radio frequency (RF) environment associated with the wireless network.

26. The computer-readable apparatus of claim 19, wherein the location of the virtual access point is at a distance from a reflecting surface to the virtual access point, the distance being equal to a distance from the reflecting surface to the location of the access point.

27. The computer-readable apparatus of claim 19, wherein:
the first machine learning model is further trained by producing a training output, the training output comprising a predicted multipath component; and
the optimization comprises an iterative minimization of an error between at least the predicted multipath component and a labeled multipath component.

28. A computerized apparatus comprising:
means for obtaining a location of a user equipment (UE) of a wireless network; and
means for given the location of the UE, generating an output comprising one or more predicted wireless measurements using a first machine learning model, the first machine learning model trained by utilizing at least:
means for obtaining a training dataset comprising (i) multipath components data and (ii) ground truth locations of a wireless device, the multipath components data corresponding to a virtual access point associated with an access point of the wireless network, the virtual access point comprising a location determined based on a location of the access point; and
means for performing an optimization with respect to the multipath components data and the ground truth locations.

29. The computerized apparatus of claim 28, wherein:
the multipath components data comprise data corresponding to time of flight, signal power, or a combination thereof; and
the one or more predicted wireless measurements comprise time of flight, signal power, or a combination thereof.

30. The computerized apparatus of claim 28, wherein:
the computerized apparatus further comprises means for determining, using a second machine learning model, an observability of the virtual access point to the UE;
the first machine learning model comprises a regressor, and the second machine learning model comprises a classifier, the classifier trained using a training dataset comprising (i) the multipath components data, (ii) the ground truth locations of the wireless device, and (iii) observabilities of virtual access points to the wireless device; and
the generating of the output comprising the one or more predicted wireless measurements is performed responsive to the observability of the virtual access point being positive.

31. The method of claim 1, wherein the location of the virtual access point comprises a location that is mirrored across a reflecting surface with respect to the access point of the wireless network.

* * * * *